US012202260B2

(12) United States Patent
Gohda et al.

(10) Patent No.: US 12,202,260 B2
(45) Date of Patent: Jan. 21, 2025

(54) LIQUID DISCHARGE APPARATUS AND DETECTION METHOD

(71) Applicants: Mitsunobu Gohda, Kanagawa (JP); Masahiro Mizuno, Kanagawa (JP); Tomoaki Hayashi, Tokyo (JP)

(72) Inventors: Mitsunobu Gohda, Kanagawa (JP); Masahiro Mizuno, Kanagawa (JP); Tomoaki Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 138 days.

(21) Appl. No.: 17/959,226

(22) Filed: Oct. 3, 2022

(65) Prior Publication Data

US 2023/0109757 A1 Apr. 13, 2023

(30) Foreign Application Priority Data

Oct. 7, 2021 (JP) ................................ 2021-165708
Sep. 14, 2022 (JP) ................................ 2022-146500

(51) Int. Cl.
*B41J 2/045* (2006.01)
*B41J 11/00* (2006.01)

(52) U.S. Cl.
CPC ....... *B41J 2/04505* (2013.01); *B41J 2/04573* (2013.01); *B41J 11/008* (2013.01)

(58) Field of Classification Search
CPC .................................................... B41J 2/04505
See application file for complete search history.

(56) References Cited

U.S. PATENT DOCUMENTS 8,937,745 B2 * 1/2015 Regelsberger ....... B41J 2/04505 347/14
2010/0066782 A1 * 3/2010 Yamamoto ............... B41J 29/13 271/265.01
2010/0195129 A1 * 8/2010 Iio ........................ G06V 10/993 358/1.12
2016/0121602 A1 5/2016 Nagasu et al.
2017/0165960 A1 6/2017 Sunaoshi et al.
2017/0165961 A1 6/2017 Hayashi et al.
2017/0182764 A1 6/2017 Nagasu et al.
(Continued)

FOREIGN PATENT DOCUMENTS

JP 2012220405 A * 11/2012
JP 2018-130956 8/2018
(Continued)

*Primary Examiner* — Shelby L Fidler
(74) *Attorney, Agent, or Firm* — Duft & Bornsen, PC

(57) ABSTRACT

A liquid discharge apparatus includes liquid discharge head units, an image sensor, and processing circuitry. The circuitry detects, based on image data detected by the sensor, an amount of deviation between positions on an object onto which liquid has been discharged by the head units; corrects a timing of discharging the liquid, based on the amount of deviation; switches between first control of conveying the object at a first speed while the sensor images the object with a first image size and second control of conveying the object at a second speed faster than the first speed while the sensor images the object with a second image size having a smaller number of pixels; and sets pixel positions of the sensor used for imaging during the second control, according to the amount of deviation detected based on the image data imaged with the first image size by the first control.

6 Claims, 26 Drawing Sheets

(56) References Cited

U.S. PATENT DOCUMENTS

| | | | |
|---|---|---|---|
| 2017/0266965 | A1 | 9/2017 | Gohda et al. |
| 2018/0236794 | A1* | 8/2018 | Mizuno .................. B41J 25/001 |
| 2018/0270366 | A1 | 9/2018 | Sunaoshi et al. |
| 2018/0272694 | A1 | 9/2018 | Gohda et al. |
| 2018/0361766 | A1 | 12/2018 | Shirato et al. |
| 2019/0143675 | A1 | 5/2019 | Nagasu et al. |
| 2020/0171816 | A1 | 6/2020 | Katoh et al. |
| 2020/0171846 | A1 | 6/2020 | Hayashi et al. |
| 2020/0171854 | A1 | 6/2020 | Sunaoshi et al. |
| 2020/0290376 | A1 | 9/2020 | Hayashi |
| 2020/0298596 | A1 | 9/2020 | Hayashi |
| 2021/0023837 | A1 | 1/2021 | Nagasu et al. |
| 2022/0169016 | A1 | 6/2022 | Mizuno et al. |

FOREIGN PATENT DOCUMENTS

| | | | |
|---|---|---|---|
| JP | 2018-154127 | | 10/2018 |
| JP | 2018167946 | A * | 11/2018 |
| JP | 2019-001160 | | 1/2019 |

* cited by examiner

FIG. 17

| | ADJUSTMENT MODE | PRINT MODE |
|---|---|---|
| IMAGE SIZE | 500 PIXELS × 500 PIXELS | 100 PIXELS × 100 PIXELS |
| IMAGE SENSOR PROCESSING SPEED | 5 FRAMES/sec | 125 FRAMES/sec |
| PRINT SPEED | 200 mm/s | 3000 mm/s |
| DETECTION RESOLUTION | 50 mm/SHEET | 25 mm/SHEET |
| SAMPLING SPEED | 4 FRAMES/sec | 120 FRAMES/sec |

LIQUID DISCHARGE APPARATUS AND DETECTION METHOD

CROSS-REFERENCE TO RELATED APPLICATIONS

This patent application is based on and claims priority pursuant to 35 U.S.C. § 119 (a) to Japanese Patent Application Nos. 2021-165708, filed on Oct. 7, 2021, and 2022-146500, filed on Sep. 14, 2022, in the Japan Patent Office, the entire disclosure of which is hereby incorporated by reference herein.

BACKGROUND

Technical Field

Embodiments of the present disclosure relates to a liquid discharge apparatus and a detection method.

Related Art

In the related art, methods are known for performing various processes using a head unit. For example, a method is known for performing image formation by an inkjet system of discharging ink from a head unit. A method is also known for improving print quality of an image printed on a print medium by this image formation.

For example, in order to enhance the accuracy of the discharge position between a plurality of head units provided in the conveyance direction, a technology is known in the art in which an image sensor is arranged at each head unit position to detect the actual position of a paper sheet between the head units at the discharge timing generated on the basis of the encoder and adjust the discharge timing.

SUMMARY

According to an embodiment of the present disclosure, a liquid discharge apparatus includes a plurality of liquid discharge head units, an image sensor, and processing circuitry. The plurality of liquid discharge head units are disposed at different positions on a path in a conveyance direction in which an object is to be conveyed. The image sensor images a region of the object onto which liquid has been discharged by the plurality of liquid discharge head units. The processing circuitry detects, based on image data imaged by the image sensor, an amount of deviation between positions on the object onto which the liquid has been discharged by the plurality of liquid discharge head units; corrects a timing of discharging the liquid from the plurality of liquid discharge head units, based on the amount of deviation detected; as control performed while detecting the amount of deviation, switches between a first control of conveying the object at a first conveyance speed while the image sensor images the object with a first image size and a second control of conveying the object at a second conveyance speed faster than the first conveyance speed while the image sensor images the object with a second image size having a smaller number of pixels than the first image size; and sets pixel positions of the image sensor used for imaging while the second control is performed, according to the amount of deviation detected based on the image data imaged with the first image size by the first control.

According to another embodiment of the present disclosure, a liquid discharge apparatus includes a plurality of liquid discharge head units, an image sensor, and processing circuitry. The plurality of liquid discharge head units are disposed at different positions on a path in a conveyance direction in which an object is to be conveyed. The image sensor is provided for each of the plurality of liquid discharge head units to image a region of the object onto which liquid has been discharged by the plurality of liquid discharge head units. The processing circuitry detects, based on image data imaged by the image sensor, an amount of deviation between positions on the object onto which the liquid has been discharged by the plurality of liquid discharge head units; corrects a timing of discharging the liquid from the plurality of liquid discharge head units, based on the amount of deviation detected; as control performed while detecting the amount of deviation, switches between a first control of conveying the object at a first conveyance speed while the image sensor images the object with a first image size and a second control of conveying the object at a second conveyance speed faster than the first conveyance speed while the image sensor images the object with a second image size having a smaller number of pixels than the first image size; and controls movement of the plurality of liquid discharge head units in a main scanning direction based on at least one of an amount of deviation in the main scanning direction detected with the first image size while the first control is performed or an amount of deviation in the main scanning direction detected with the second image size while the second control is performed.

According to another embodiment of the present disclosure, there is provided a detection method to be performed by a liquid discharge apparatus that includes a plurality of liquid discharge head units disposed at different positions on a path in a conveyance direction to which an object is to be conveyed and an image sensor to image a region of the object onto which liquid has been discharged by the plurality of liquid discharge head units. The method includes detecting, correcting, switching, and setting. The detecting detects, based on image data imaged by the image sensor, an amount of deviation between positions on the object onto which the liquid has been discharged by the plurality of liquid discharge head units. The correcting corrects a timing of discharging the liquid from the plurality of liquid discharge head units, based on the amount of deviation detected by the detecting. The switching switches between a first control of conveying the object at a first conveyance speed while the image sensor images the object with a first image size and a second control of conveying the object at a second conveyance speed faster than the first conveyance speed while the image sensor images the object with a second image size having a smaller number of pixels than the first image size, as control performed while detecting the amount of deviation. The setting sets pixel positions of the image sensor used for imaging while the second control is performed, according to the amount of deviation based on the image data imaged with the first image size by the first control.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 17 is a table containing information set for each mode settable in the liquid discharge apparatus according to an embodiment of the present disclosure;

Figure 1:
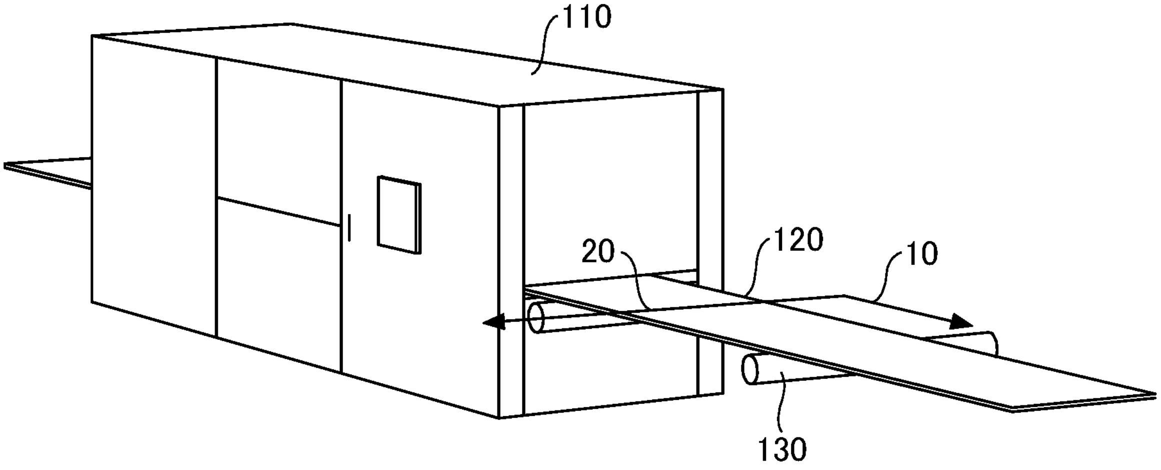
FIG. 1 is a schematic view of a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, embodiments of the present disclosure will be described with reference to the accompanying drawings. In the present specification and the drawings, components including substantially the same functions are denoted by the same reference signs, and redundant description of the components is omitted.

Overall Configuration

Below, a case where a head unit included in the conveyance apparatus is a liquid discharge head unit that discharges a liquid, and a position where the liquid discharge head unit discharges the liquid onto a web is referred to as a "processing position" will be described as an example. When the head unit included in the conveyance apparatus is a liquid discharge head unit that discharges a liquid, the conveyance apparatus is a liquid discharge apparatus.

FIG. 1 is a schematic view of a liquid discharge apparatus according to an embodiment of the present disclosure. In such a liquid discharge apparatus, the discharged liquid is a recording liquid such as aqueous or oily ink. The following description is provided on the assumption that the liquid discharge apparatus is an image forming apparatus as an example.

The liquid discharge apparatus 110 conveys a conveyance target object such as a web 120. In the present embodiment, the conveyance target object is the web 120. In the illustrated example, the liquid discharge apparatus 110 discharges a liquid onto the web 120 conveyed by a roller 130 or the like to form an image. In a case of forming an image, the web 120 can also be said to be a recording medium. The web 120 is a continuous paper printing medium or the like. In other words, the web 120 is a roll-shaped sheet or the like that can be wound up.

For example, the liquid discharge apparatus 110 is a production printer. The following description is provided on the assumption that the roller 130 adjusts the tension of the web 120 and the web 120 is conveyed in the illustrated direction (hereinafter referred to as "conveyance direction 10") as an example. In the drawing, a direction orthogonal to the conveyance direction 10 is referred to as an "orthogonal direction 20". In the present embodiment, the liquid discharge apparatus 110 is an inkjet printer that discharges ink of four colors of black (K), cyan (C), magenta (M), and yellow (Y) to form an image at a predetermined position on the web 120.

Figure 2:
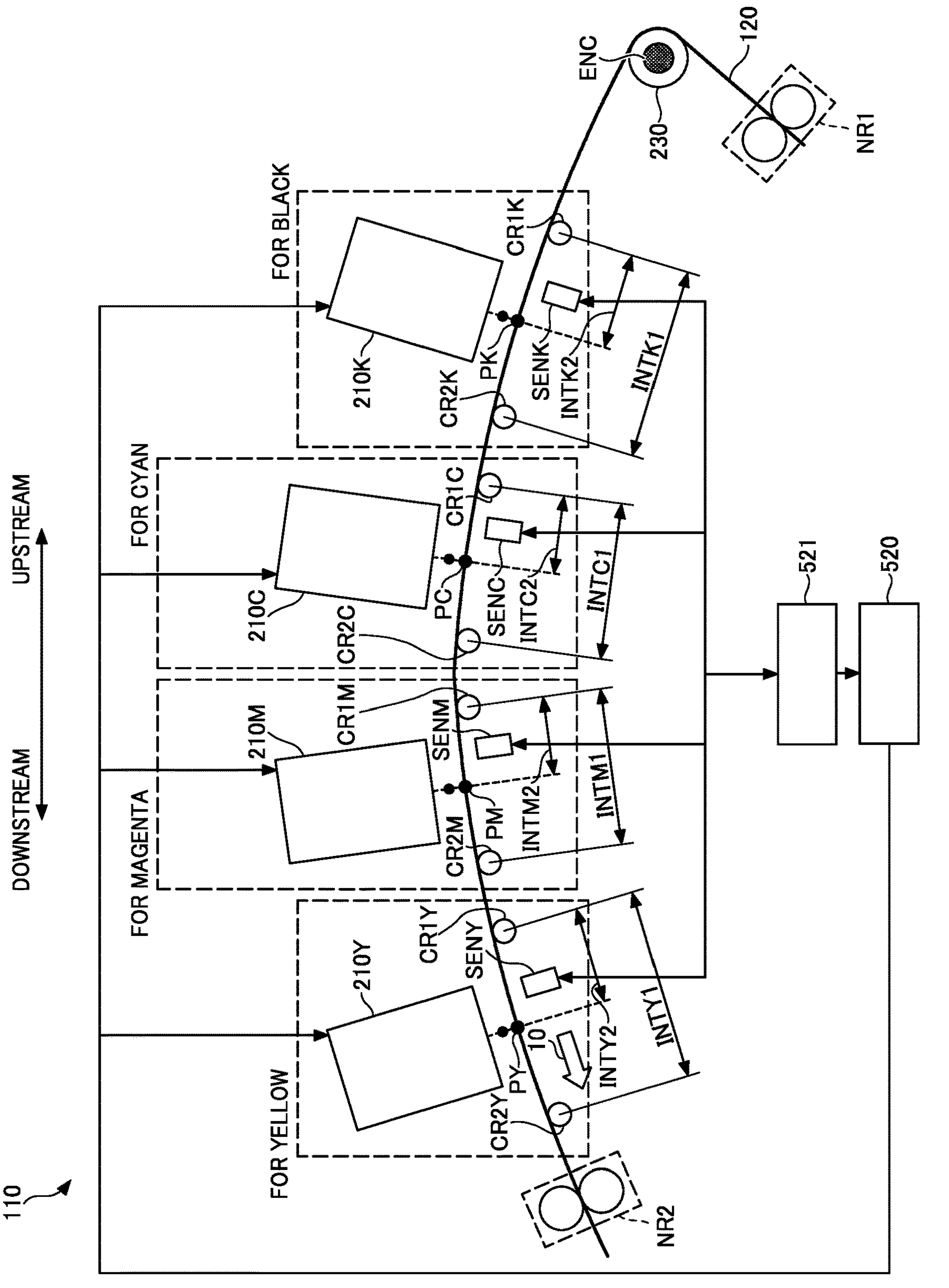
FIG. 2 is a schematic view of a general configuration example of the liquid discharge apparatus according to an embodiment of the present disclosure.

FIG. 2 is a schematic view of a general configuration example of the liquid discharge apparatus according to an embodiment of the present disclosure. As illustrated in FIG. 2, the liquid discharge apparatus 110 has four liquid discharge head units for discharging ink of four colors.

Each of the liquid discharge head units performs a process of discharging a liquid of the corresponding color to the web 120 conveyed in the conveyance direction 10. It is assumed that the web 120 is conveyed by two pairs of nip rollers, a roller 230, and other members. Below, among the two pairs of nip rollers, a pair of nip rollers installed upstream of the liquid discharge head units is referred to as "first nip rollers NR1". On the other hand, a pair of nip rollers installed downstream of the first nip roller NR1 and the liquid discharge head units is referred to as "second nip rollers NR2". As illustrated in FIG. 2, each pair of nip rollers rotates with a conveyance target object such as the web 120 in between. As described above, the pairs of nip rollers and the roller 230 constitute, for example, a mechanism that conveys a conveyance target object such as the web 120 in a predetermined direction. That is, the liquid discharge head units are provided at different positions on a path in the conveyance direction 10 in which a conveyance target object such as the web 120 is conveyed.

The liquid discharge apparatus 110 includes a measurement device that measures the amount of movement of the web 120 conveyed by the roller 230 or the like. For example, the measurement device is an encoder ENC. Specifically, the encoder ENC is a device including a rotating plate and a rotation detection sensor that reads surface information from the rotating plate. For example, the rotating plate of the encoder ENC is installed on a rotation shaft of the roller 230 as illustrated in the drawing. When the roller 230 rotates, the rotating plate rotates accordingly, and the rotation detection sensor outputs an encoder pulse ENP which is a pulse corresponding to the rotation amount. The measurement device is not limited to the encoder ENC, and may be any device capable of measuring the movement amount. The measurement device may be installed at a position other than the illustrated position as long as the measurement device can measure the movement amount.

The recording medium of the web 120 is desirably long. Specifically, the length of the recording medium is desirably longer than the distance between the first nip rollers NR1 and the second nip rollers NR2. The recording medium is not limited to the web. For example, the recording medium may be a sheet that is folded and stored, a so-called "Z paper", or the like.

Below, in the illustrated overall configuration example, a plurality of liquid discharge heads of a liquid discharge head unit group 210 are arranged in the order of black (K), cyan (C), magenta (M), and yellow (Y) from the upstream side toward the downstream side. That is, a liquid discharge head unit installed on the most upstream side (hereinafter referred to as a "black liquid discharge head unit 210K") is for black (K). A liquid discharge head unit installed next to the black liquid discharge head unit 210K (hereinafter, referred to as a "cyan liquid discharge head unit 210C") is for cyan (C). A liquid discharge head unit installed next to the cyan liquid discharge head unit 210C (hereinafter referred to as a "magenta liquid discharge head unit 210M") is for magenta (M). A liquid discharge head unit installed on the most downstream side (hereinafter referred to as a "yellow liquid discharge head unit 210Y") is set for yellow (Y).

The liquid discharge head units 210K, 210C, 210M, and 210Y of the liquid discharge head unit group 210 discharge ink of corresponding colors to predetermined positions on the web 120 based on image data or other data. Positions where the discharged ink lands on the web 120 (hereinafter referred to as "landing positions") are substantially equal to positions where the liquid discharge head units discharge the ink (hereinafter referred to as "discharge positions"). That is, the discharge positions are directly below the liquid discharge head units. The following description is provided on the assumption that the discharge positions are processing positions where a conveyance target object is processed by the liquid discharge head units as an example. The liquid discharge head units discharge the ink of corresponding colors to predetermined positions on the web 120 based on image data or other data.

In the present embodiment, black ink is discharged to a landing position of the black liquid discharge head unit 210K (hereinafter referred to as a "black landing position PK"). Similarly, cyan ink is discharged to a landing position of the cyan liquid discharge head unit 210C (hereinafter referred to as a "cyan landing position PC"). Magenta ink is discharged to a landing position of the magenta liquid discharge head unit 210M (hereinafter referred to as "magenta landing position PM"). Yellow ink is discharged to a landing position of the yellow liquid discharge head unit 210Y (hereinafter referred to as "yellow landing position PY").

Below, the timings at which the liquid discharge head units 210K, 210C, 210M, and 210Y of the liquid discharge head unit group 210 execute processing are referred to as "processing timings". Specifically, at the processing timings, the liquid discharge head units 210K, 210C, 210M, and 210Y of the liquid discharge head unit group 210 discharges ink. For example, a controller 520 connected to the liquid discharge head units 210K, 210C, 210M, and 210Y of the liquid discharge head unit group 210 controls the processing timings at which the liquid discharge head units 210K, 210C, 210M, and 210Y of the liquid discharge head unit group 210 discharge ink, and controls actuators ACT disposed in the liquid discharge head units 210K, 210C, 210M, and 210Y. The processing timings and the actuators ACT may be controlled by two or more controllers or circuits. Adjustment of the amount of deviation caused by the actuator ACT will be described later.

As illustrated in FIG. 2, a calculator 521 is connected to the controller 520. The calculator 521 calculates the amount of deviation between the liquid discharge head units 210K, 210C, 210M, and 210Y of the liquid discharge head unit group 210 based on the detection results input from the sensor devices SENY, SENM, SENC, and SENK. The calculator 521 corrects the timing at which each of the liquid discharge head units 210K, 210C, 210M, and 210Y of the liquid discharge head unit group 210 discharges liquid based on the amount of deviation. The controller 520 controls the liquid discharge head unit group 210 or other devices according to the corrected timings.

In the example illustrated in FIG. 2, a plurality of rollers are installed in the liquid discharge head units 210K, 210C, 210M, and 210Y of the liquid discharge head unit group 210. As illustrated in FIG. 2, for example, the plurality of rollers are installed upstream and downstream of each of the liquid discharge head units 210K, 210C, 210M, and 210Y in the conveyance direction of the web 120. Specifically, in the conveyance path of the web 120, rollers that support the web 120 (hereinafter referred to as "first rollers") are installed upstream from the landing positions of the liquid discharge head units 210K, 210C, 210M, and 210Y of the liquid discharge head unit group 210. Further, rollers that support the web 120 (hereinafter referred to as "second rollers") are installed downstream from the landing positions.

Installing the first rollers and the second rollers as described above reduces fluttering of the web 120 at the landing positions. The first rollers and the second rollers are disposed in the conveyance path of the recording medium, and are driven rollers, for example. The first rollers and the second rollers may be rollers rotationally driven by a motor or other device.

The first rollers as an example of first support members and the second rollers as an example of second support members may not be rotating bodies such as driven rollers. That is, the first rollers and the second rollers may be any support members that support the conveyance target object. For example, the first support members and the second support members may be pipes or shafts having a circular cross section. Besides, the first support members and the second support members may be curved plates or the like in which a portion in contact with the conveyance target object has an arc shape. The following description is provided on the assumption that the first support members are the first rollers and the second support members are the second rollers as an example.

Specifically, a first roller for black CR1K is installed upstream in the conveyance direction of the web 120 at the black landing position PK. On the other hand, a second roller for black CR2K is installed downstream of the black landing position PK in the conveyance direction of the web.

Similarly, a first roller for cyan CR1C and a second roller for cyan CR2C are installed with respect to the cyan liquid discharge head unit 210C. Furthermore, a first roller for magenta CR1M and a second roller for magenta CR2M are installed with respect to the magenta liquid discharge head unit 210M. A first roller for yellow CR1Y and a second roller for yellow CR2Y are installed with respect to the yellow liquid discharge head unit 210Y.

Figure 3A:
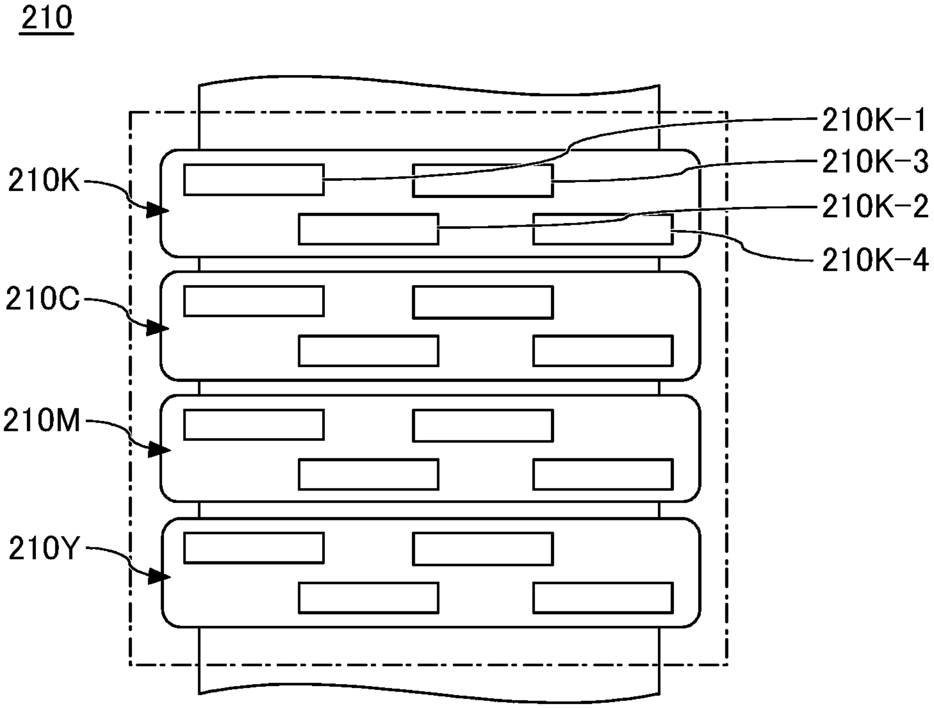
FIG. 3A is a diagram illustrating the outer shapes of liquid discharge head units according to an embodiment of the present disclosure.
Figure 3B:
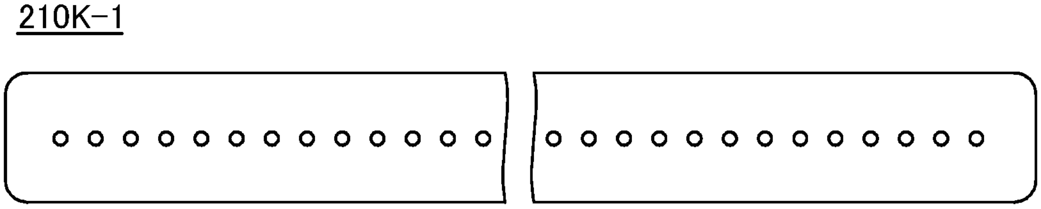
FIG. 3B is a diagram illustrating the outer shape of a head according to an embodiment of the present disclosure.

FIG. 3A is a diagram illustrating the outer shapes of liquid discharge head units according to an embodiment of the present disclosure. FIG. 3B is a diagram illustrating the outer shape of a head according to an embodiment of the present disclosure; As illustrated, FIG. 3A is a schematic plan view of an example of the four liquid discharge head units 210K, 210C, 210M, and 210Y included in the liquid discharge apparatus 110.

As illustrated in FIG. 3A, the liquid discharge head units are line head units in this example. That is, in the liquid discharge apparatus 110, the four liquid discharge head units 210K, 210C, 210M, and 210Y corresponding to black (K), cyan (C), magenta (M), and yellow (Y) are arranged from the upstream side in the conveyance direction 10.

In the present embodiment, the liquid discharge head unit 210K for black (K) includes four heads 210K-1, 210K-2, 210K-3, and 210K-4 arranged in a staggered manner in an orthogonal direction. Thus, the liquid discharge apparatus 110 can form an image in the entire region (printing region) on the web 120 where the image is to be formed in the width direction (orthogonal direction). Since the configurations of the other liquid discharge head units 210C, 210M, and 210Y are similar to the configuration of the liquid discharge head unit 210K for black (K), the description thereof may be omitted.

In the present embodiment, the liquid discharge head unit group 210 includes four heads. However, a liquid discharge head unit including a single head may be provided.

Example of Detector

For example, as illustrated in FIG. 2, the liquid discharge apparatus 110 includes sensor devices that are an example of hardware constituting detectors so as to detect regions of liquids discharged from the liquid discharge head units 210K, 210C, 210M, and 210Y of the liquid discharge head unit group 210. The sensor devices are units including sensors. The sensors are devices capable of acquiring information on the web 120. Based on the information acquired by the sensors, the liquid discharge apparatus 110 detects the position of the recording medium, the conveyance speed, the conveyance amount, or a combination thereof in the orthogonal direction, the conveyance direction, or both directions.

<Hardware Configuration Example of Sensor Devices>

As the sensor devices according to the present embodiment, for example, image sensors are preferably used that capture of an image of a recording medium using light such as a laser or infrared rays. The image sensors may be, for example, charge coupled device (CCD) image sensors, complementary metal oxide semiconductor (CMOS) image sensors, photodiode arrays, or the like.

Further, the image sensors are desirably of the global shutter type. Even if the conveyance speed is high, the image sensors of the global shutter type can reduce misalignment of images caused by a difference in shutter timing as compared with the image sensors of the rolling shutter type or the like. Furthermore, the image sensors are provided so as to be able to acquire information on the surface of the recording medium, for example. The image sensors may be of the same type or different types. The following description is provided on the assumption that all the image sensors are of the same type.

In the present embodiment, as illustrated in the drawing, the liquid discharge apparatus 110 includes sensor devices so as to detect the regions to which the liquids are discharged by the four liquid discharge head units as an example. The configuration and position of the sensors are not limited to the illustrated example. A specific configuration of the sensor devices according to the present embodiment will be described later.

The liquid discharge apparatus 110 may further include sensor devices separately from the illustrated sensor devices. For example, there may further be sensor devices upstream of the illustrated sensor devices.

In the following description, the sensor device including an image sensor installed with respect to the black liquid discharge head unit 210K is referred to as a "sensor device for black SENK". Similarly, the sensor device installed with respect to the cyan liquid discharge head unit 210C is referred to as a "sensor device for cyan SENC". The sensor device installed with respect to the magenta liquid discharge head unit 210M is referred to as a "sensor device for magenta SENM". The sensor device installed with respect to the yellow liquid discharge head unit 210Y is referred to as a "yellow sensor device SENY". In the following description, the sensor device for black SENK, the sensor device for cyan SENC, the sensor device for magenta SENM, and the sensor device for yellow SENY may be collectively referred to simply as "sensor devices SEN".

In FIG. 2, the sensor device for black SENK, the sensor device for cyan SENC, the sensor device for magenta SENM, and the sensor device for yellow SENY are illustrated as separate components for ease of description. However, this illustration conceptually indicates that detection is possible for each liquid discharge head unit, and a specific configuration of the sensor devices will be described later.

In the following description, "positions where the sensors are installed" refer to positions where information is acquired or the like. Therefore, all the components of the sensor devices do not need to be installed at the "positions where the sensors are installed", and device components other than the components necessary for acquiring the information on the web 120 may be connected by cables or the like and installed at other positions. The sensor device for black SENK, the sensor device for cyan SENC, the sensor device for magenta SENM, and the sensor device for yellow SENY indicate examples of the positions where the sensors are installed.

The positions where the sensors are installed are desirably positions close to the corresponding landing positions. When the sensors are installed at positions close to the corresponding landing positions, distances between the landing positions and the sensors are shortened. When the distances between the landing positions and the sensors are shortened, detection errors can be reduced. As a result, the image forming apparatus can accurately detect the position and the like of the conveyance target object by the sensors.

Specifically, each of the positions close to the landing positions is, for example, between the corresponding first roller and second roller as illustrated in FIG. 2. That is, in the illustrated example, the position where the sensor device for black SENK is installed is desirably between the rollers for black INTK1 as illustrated in the drawing. Similarly, the position where the sensor device for cyan SENC is installed is desirably between rollers for cyan INTC1 as illustrated in the drawing. The position where the sensor device for magenta SENM is installed is desirably between rollers for magenta INTM1 as illustrated in the drawing. The position where the sensor device for yellow SENY is installed is desirably between rollers for yellow INTY1 as illustrated in the drawing.

As described above, when the sensor devices are installed between the corresponding rollers, the image sensors can detect, for example, the positions of the recording medium at the positions close to the landing positions. Between the rollers, the meandering speed which is a moving speed in the orthogonal direction and the conveyance speed which is a moving speed in the conveyance direction are relatively stable in many cases. As a result, the sensor devices can accurately detect the position and the like of the conveyance target object.

Furthermore, the positions where the sensors are installed are desirably positions closer to the first roller than the landing position between the rollers. That is, the positions where the sensors are installed are desirably upstream of the landing positions.

Specifically, the position where the sensor device for black SENK is installed is desirably in a section between the black landing position PK and the position where the first roller for black CR1K is installed toward the upstream side (hereinafter referred to as "upstream section for black INTK2"). Similarly, the position where the sensor device for cyan SENC is installed is desirably in a section between the cyan landing position PC and the position where the first roller for cyan CR1C is installed toward the upstream side (hereinafter referred to as "upstream section for cyan INTC2"). The position where the sensor device for magenta SENM is installed is desirably in a section between the magenta landing position PM and the position where the first roller for magenta CR1M is installed toward the upstream side (hereinafter referred to as "upstream section for magenta INTM2"). The position where the sensor device for yellow SENY is installed is desirably in a section between the yellow landing position PY and the position where the first roller for yellow CR1Y is installed toward the upstream side (hereinafter referred to as "upstream section for yellow INTY2").

When the sensors are installed in the upstream section for black INTK2, the upstream section for cyan INTC2, the upstream section for magenta INTM2, and the upstream section for yellow INTY2, the liquid discharge apparatus 110 can accurately detect, for example, the position of the conveyance target object.

When the sensors are installed at such positions, the sensors are located upstream of the landing positions. With such a configuration, the liquid discharge apparatus 110 can accurately detect the position of the recording medium in the orthogonal direction, the conveyance direction, or both directions based on the data imaged by the sensors on the upstream side. Since the liquid discharge apparatus 110 can accurately detect liquid in the orthogonal direction, the conveyance direction, or both directions, the liquid discharge apparatus 110 can calculate the processing timings at which the liquid discharge head units discharge liquids, the amounts of movement of the head units, or both. In other words, after the position of the web 120 is detected on the upstream side, when the web 120 is conveyed to a landing position, the processing timing is calculated or the head unit is moved during the conveyance, so that the liquid discharge apparatus 110 can accurately change the landing position.

When the positions immediately below the liquid discharge head units are defined as the positions where the sensors are installed, color deviation may occur due to a delay of a control operation or the like. Therefore, when the positions where the sensors are installed are set upstream of the landing positions, the liquid discharge apparatus 110 can reduce the color deviation and increase the image quality. There may be a restriction on setting the positions where the sensors are installed in the vicinity of the landing positions. For this reason, the positions where the sensors are installed are desirably closer to the first roller than the landing position.

Figure 4:
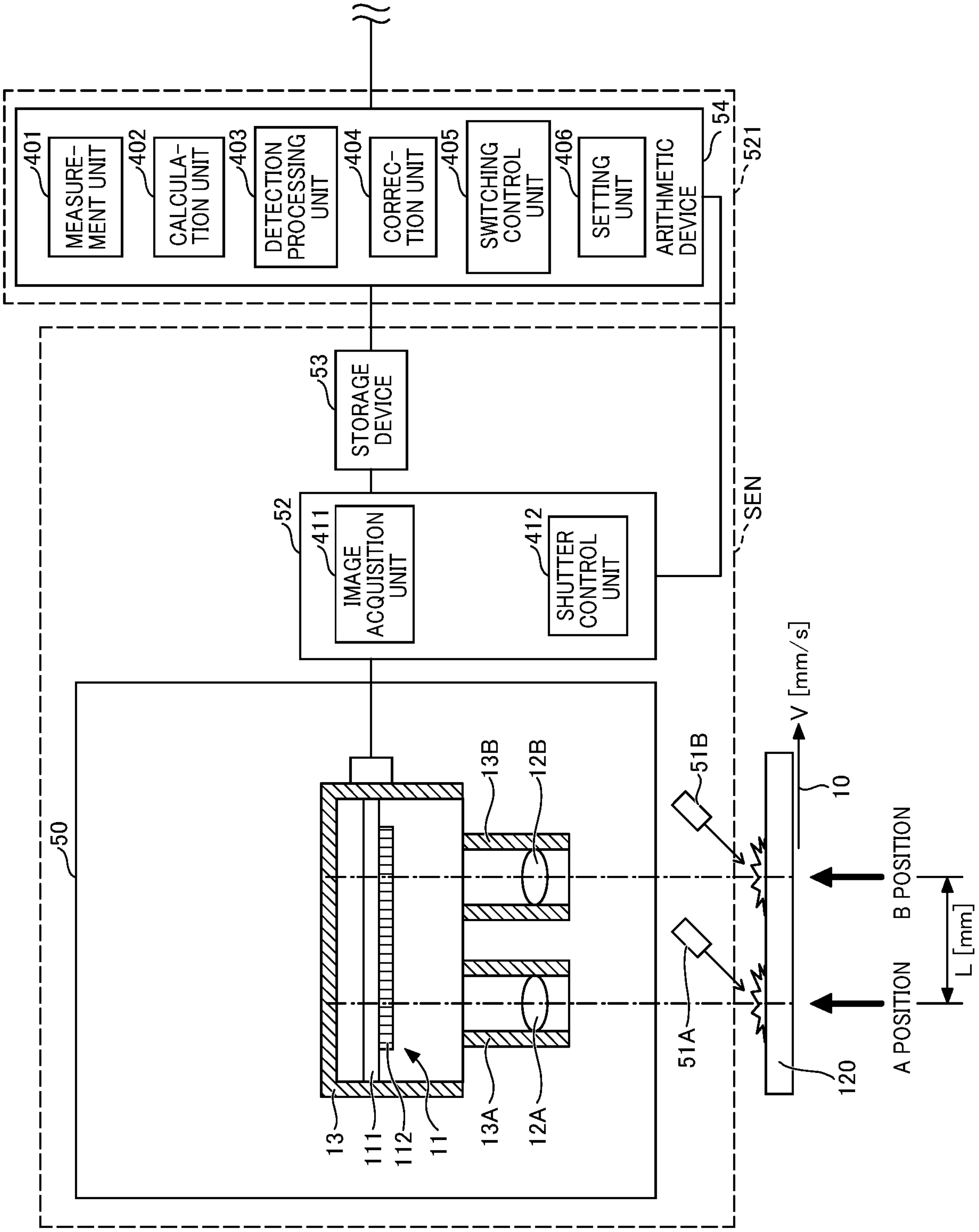
FIG. 4 is a block diagram illustrating a configuration example of implementing a detector according to an embodiment of the present disclosure.

FIG. 4 is a block diagram illustrating a configuration example that implements a detector according to an embodiment of the present disclosure. For example, the detector is implemented by hardware such as the sensor device SEN as illustrated and hardware such as the calculator 521. The sensor device SEN and the calculator 521 are connected via a signal line or the like.

The sensor device SEN includes a detection device 50, a first light source 51A, a second light source 51B, a control device 52, and a storage device 53.

The first light source 51A and the second light source 51B include a light emitting element that emits laser light and a collimator lens that turns the laser light emitted from the light emitting element into substantially parallel light. The first light source 51A and the second light source 51B are installed at positions where to irradiate the surface of the web 120 with laser light from an oblique direction. The detection device 50 is provided so as to perform imaging with the laser light emitted by the first light source 51A and the second light source 51B.

The present embodiment is an example of performing adjustment based on the amount of deviation of mounting positions or the like between the plurality of sensor devices SEN.

Figure 5:
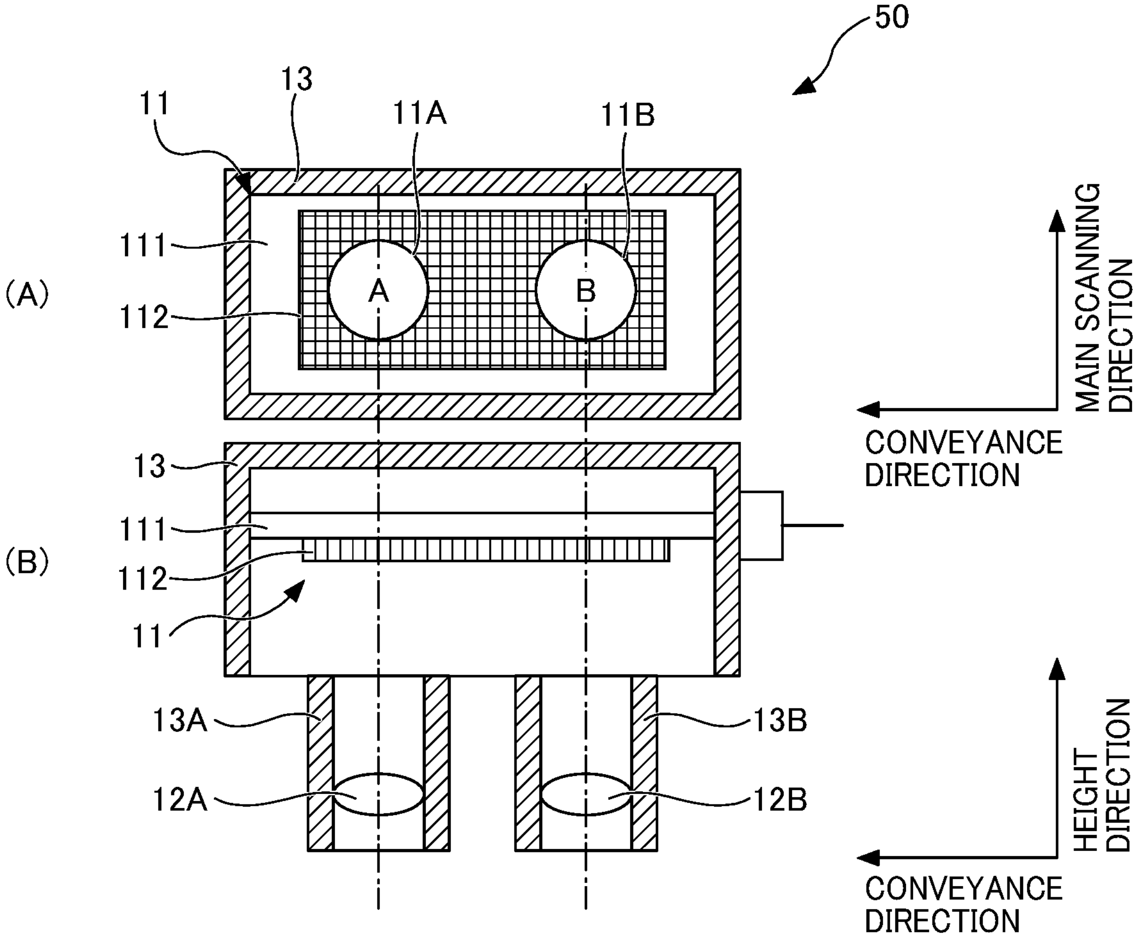
FIG. 5 is a cross-sectional view of a detection device according to an embodiment of the present disclosure.

FIG. 5 is a cross-sectional view of the detection device 50 according to an embodiment of the present disclosure. In the example illustrated in parts (A) and (B) of FIG. 5, the internal configuration of the detection device 50 is illustrated by two sides.

Part (A) of FIG. 5 is a diagram illustrating a cross section of the detection device 50 represented to include the conveyance direction and the main scanning direction. Part (B) of FIG. 5 is a diagram illustrating a cross section of the detection device 50 represented to include the conveyance direction and the height direction.

The detection device 50 includes a first lens barrel 13A and a second lens barrel 13B so as to be aligned in the conveyance direction in a housing 13. The detection device 50 also internally has a first imaging lens 12A, a second imaging lens 12B, and an area sensor 11.

The first imaging lens 12A is held by the first lens barrel 13A so as to be arranged at a position facing position A. The second imaging lens 12B is held by the second lens barrel 13B so as to be arranged at a position facing position B.

The area sensor 11 is housed in the housing 13. The area sensor 11 is structured such that an imaging element 112 is formed on a silicon substrate 111, for example. On the imaging element 112, provided is a plurality of regions where two-dimensional image data can be acquired. Examples of the plurality of regions include an A region 11A for imaging the periphery of the A position and a B region 11B for imaging the periphery of the B position.

The area sensor 11 according to the present embodiment is an image sensor for performing imaging related to the plurality of liquid discharge head units. For example, the position A is in the vicinity of the landing position for the black liquid discharge head unit 210K, and the position B is in the vicinity of the landing position for the cyan liquid discharge head unit 210C.

As described above, the area sensor 11 is an image sensor that captures an image of a region (for example, the A region 11A and the B region 11B) of the web (an example of a conveyance target object) 120 onto which liquids are discharged by the plurality of liquid discharge head units.

As described above, the detection device 50 can detect the plurality of liquid discharge head units. The liquid discharge head units detected by the detection device 50 are not limited to the black liquid discharge head unit 210K and the cyan liquid discharge head unit 210C. The detection device 50 may detect liquid discharge head units for other colors. The number of liquid discharge head units detected by the detection device 50 is not limited to two, and may be three or more.

The area sensor 11 may be any image sensor, and is, for example, CCD image sensor, CMOS image sensor, photodiode array, or the like.

As illustrated in FIG. 5, an optical axis of the first imaging lens 12A substantially coincides with a center of the A region 11A. Similarly, an optical axis of the second imaging lens 12B substantially coincides with a center of the B region 11B. The first imaging lens 12A focuses light on the A region 11A to generate a two-dimensional image. Similarly, the second imaging lens 12B focuses light on the B region 11B to generate a two-dimensional image. A configuration of the detection device 50 is not limited to the configuration illustrated in FIG. 5. For example, the detection device 50 may have a configuration or the like described below.

Figure 6:
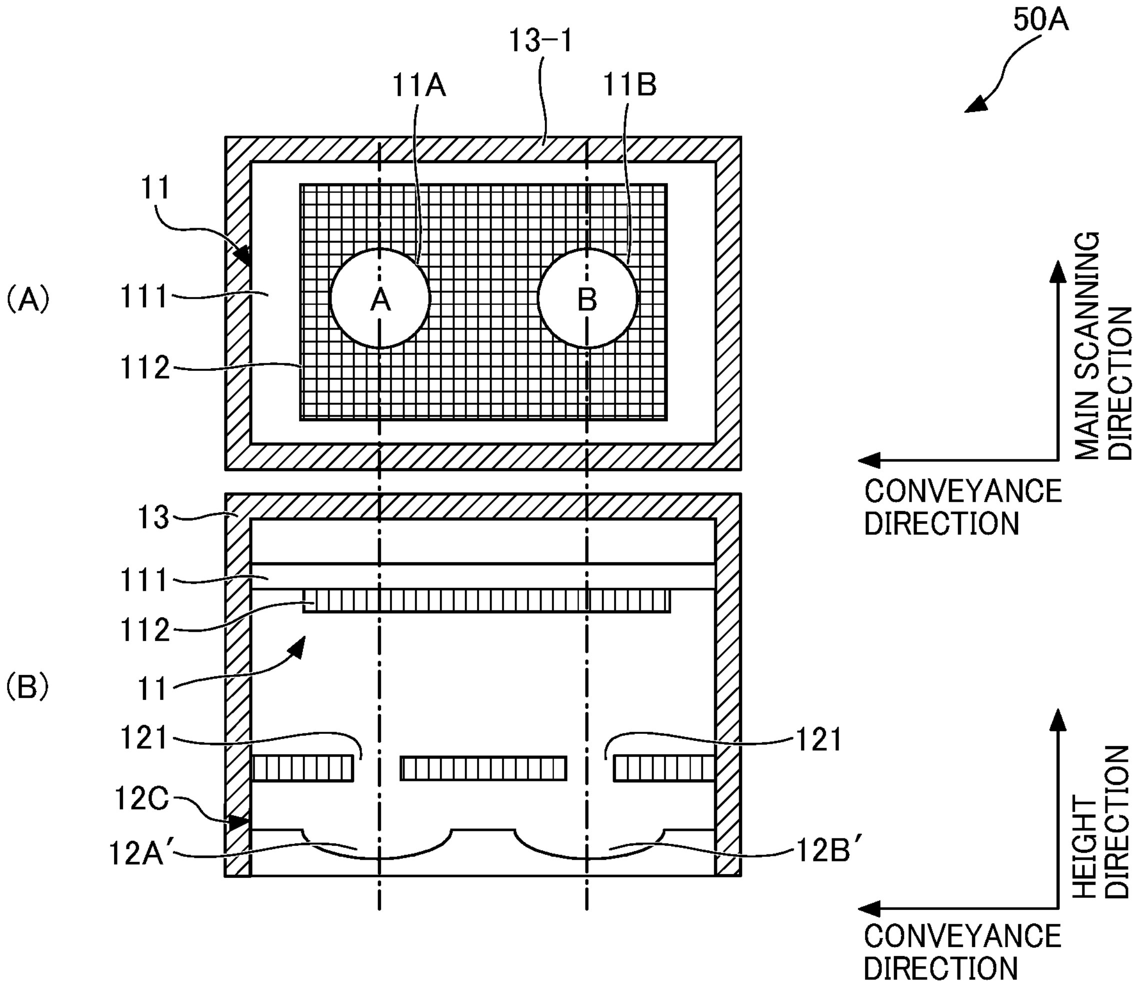
FIG. 6 is a cross-sectional view of a detection device according to a modification of the present disclosure.

FIG. 6 is a cross-sectional view of a detection device 50A according to a modification of the present disclosure. In the example illustrated in parts (A) and (B) of FIG. 6, the internal configuration of the detection device 50A is illustrated by two sides.

Part (A) of FIG. 6 is a diagram illustrating a cross section of the detection device 50A represented to include the conveyance direction and the main scanning direction Part (B) of FIG. 6 is a diagram illustrating a cross section of the detection device 50A represented to include the conveyance direction and the height direction. The detection device 50A has a lens 12C and an area sensor 11 inside a housing 13_1.

When compared with the detection device 50 illustrated in FIG. 5, the configuration of the detection device 50A illustrated in FIG. 6 is different in that the lens 12C is provided in which a first imaging lens 12A' and a second imaging lens 12B' are integrated. On the other hand, the area sensor 11 and other components are similar to the area sensor 11 and other components illustrated in FIG. 5, for example, and description thereof may be omitted.

In the example illustrated in FIG. 6, apertures 121 or the like are preferably provided so that images formed by the first imaging lens 12A' and the second imaging lens 12B' do not interfere with each other. Providing the apertures 121 can limit regions of image formation by the first imaging lens 12A' and the second imaging lens 12B'. Such a configuration can prevent one image formation from interfering with the other image formation. Accordingly, the detection device 50A can generate image data obtained by imaging the periphery of the position A and image data obtained by imaging the periphery of the position B illustrated in FIG. 4.

Figure 7:
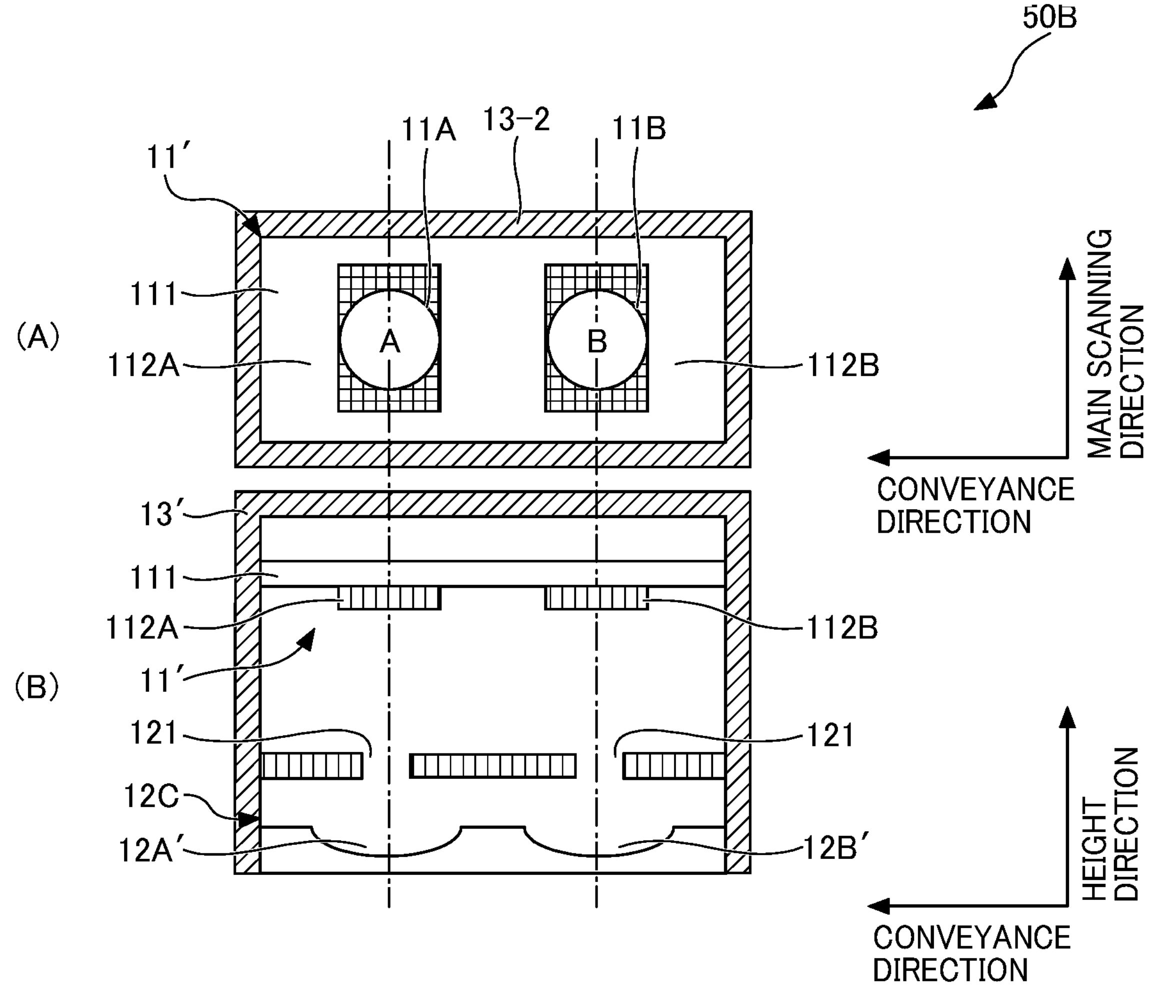
FIG. 7 is a cross-sectional view of a detection device according to a modification of the present disclosure.

FIG. 7 is a cross-sectional view of a detection device 50B according to a modification of the present disclosure. In the example illustrated in FIG. 7, the internal configuration of the detection device 50B is illustrated by two sides.

Part (A) of FIG. 7 is a diagram illustrating a cross section of the detection device 50B represented to include the conveyance direction and the main scanning direction. Part (B) of FIG. 7 is a diagram illustrating a cross section of the detection device 50B represented to include the conveyance direction and the height direction. The detection device 50B has a lens 12C and an area sensor 11' inside a housing 13-2. The lens 12C is similar to the configuration illustrated in FIG. 6, and description thereof will be omitted.

When compared with the detection device 50A illustrated in FIG. 6, the configuration of the detection device 50B illustrated in FIG. 7 is different in that the area sensor 11 is replaced with the area sensor 11'.

Figure 8:
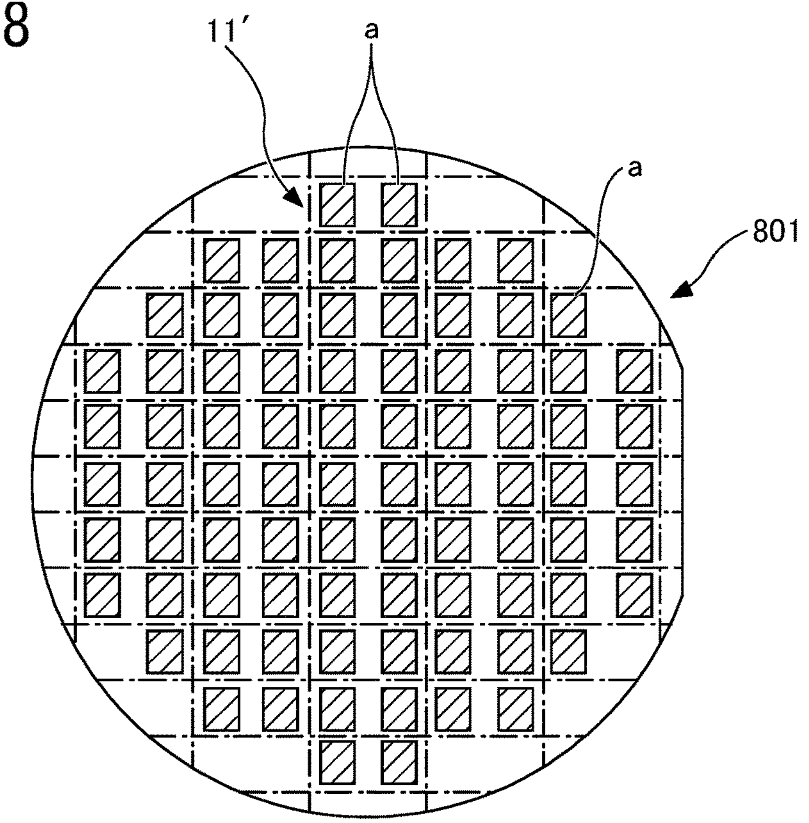
FIG. 8 is a diagram illustrating a silicon wafer from which area sensors according to a modification of the present disclosure are cut out.

FIG. 8 is a diagram illustrating a silicon wafer from which the area sensors 11' are cut out according to a modification of the present disclosure is cut. As illustrated in FIG. 8, a plurality of imaging elements a is arrayed on the silicon wafer 801. In the present modification, the area sensors 11' are cut out so as to include two imaging elements a.

As illustrated in part (A) of FIG. 7, in the cut-out area sensors 11', a first imaging element 112A and a second imaging element 112B are formed on a silicon substrate 111.

As illustrated in part (B) of FIG. 7, the positions of the first imaging lens 12A' and the second imaging lens 12B' are determined so as to correspond to the spacing between the first imaging element 112A and the second imaging element 112B.

By the way, conventionally, an imaging element is often manufactured for imaging bym for example, a general digital camera. For this reason, the ratio between the X direction and the Y direction of the imaging element, that is, the aspect ratio is often a ratio adapted to the image format, such as square, "4:3" or "16:9".

On the other hand, the detection device 50 according to the above-described embodiment and modifications, captures images of two or more regions separated at a specific spacing. Specifically, the detection device 50 captures images of regions separated at a specific spacing in the X direction which is one direction in two dimensions, that is, the conveyance direction 10 (FIG. 4). A conventional imaging element has an aspect ratio adapted to an image format. Since such an imaging element does not have a size designed for imaging by the detection device 50, some region is not used for imaging. For example, in a case of imaging two regions separated at a specific spacing in the conveyance direction 10 (X direction), a region extending in the main scanning direction (Y direction) or a region between the two regions may not be used for imaging. Even though there is a region that is not used for imaging, the resolution is preferably higher in order to detect the deviation. However, increasing the pixel density may increase the cost burden.

Therefore, in the present modification, the area sensors 11' are cut out from the silicon wafer 801 illustrated in FIG. 8. In this case, as illustrated in part (A) of FIG. 6, the first imaging element 112A and the second imaging element 112B are separated at a specific spacing on the silicon substrate 111.

In the area sensor 11' illustrated in part (A) of FIG. 7, out of the A region 11A for imaging the periphery of the A position and the B region 11B for imaging the periphery of the B position, a region not used for imaging in the main scanning direction is narrower than the region in the area sensor 11 illustrated in part (A) of FIG. 6, and imaging regions other than the region around the A region 11A and the B position are omitted in the conveyance direction 10. Therefore, in the area sensor 11' illustrated in FIG. 7, unnecessary imaging elements are omitted, thus allowing cost reduction.

Since the first imaging element 112A and the second imaging element 112B are formed by an accurate semiconductor process, the spacing between the first imaging element 112A and the second imaging element 112B can be accurately formed.

Figure 9:
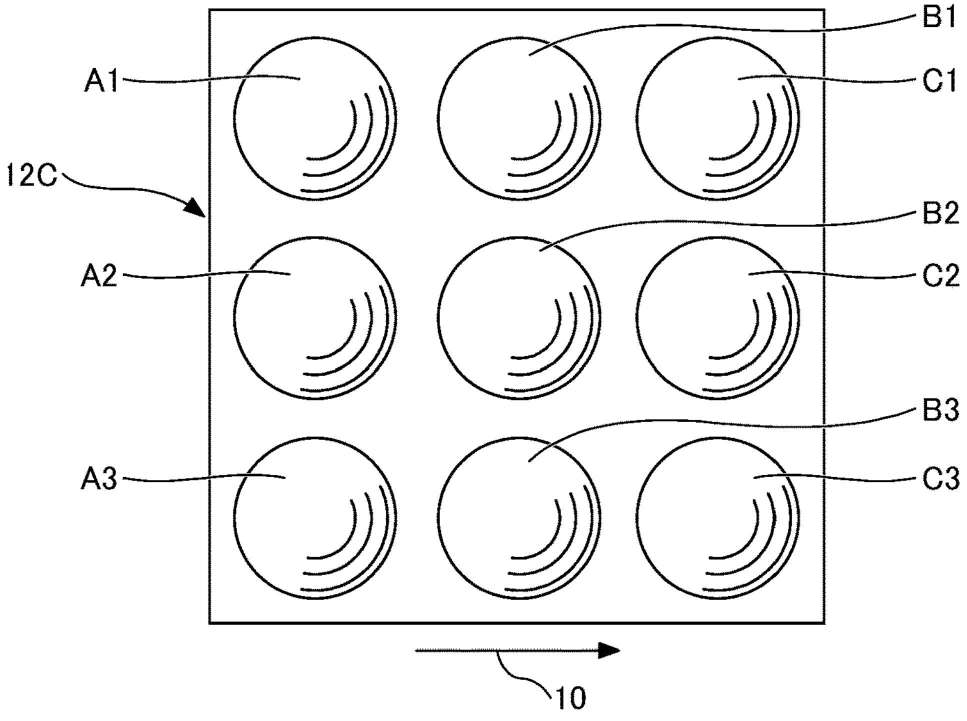
FIG. 9 is a diagram illustrating an arrangement example of a plurality of lenses used in a detection device according to a modification of the present disclosure.

FIG. 9 is a diagram illustrating an arrangement example of a plurality of lenses used in a detection device 50C according to a modification of the present disclosure. As a modification, a lens array as illustrated in FIG. 9 may be formed in the detection device 50C.

The lens array illustrated in FIG. 9 has two or more lenses integrated. Specifically, for example, the lens array has three lenses arranged in the conveyance direction, and three lenses arranged in the main scanning direction. In other words, the lens array includes a total of nine imaging lenses A1 to C3 in three rows and three columns.

In a case of using the lens array illustrated in FIG. 9, nine regions can be imaged and nine pieces of image data can be generated. In this case, an area sensor having nine imaging regions is used. One or more area sensors may be provided.

Using the lens array illustrated in FIG. 9 makes it easy to perform arithmetic operations, for example, in a plurality of imaging regions simultaneously, that is, in parallel. For example, the amount of deviation among the plurality of imaging regions in the main scanning direction can be detected in parallel. As another example, in the conveyance direction, the amount of deviation between the region imaged by the lenses A1 to A3 and the region imaged by the lenses B1 to B3 and the amount of displacement between the region imaged by the lenses B1 to B3 and the region imaged by the lenses C1 to C3 can be detected in parallel.

Furthermore, in the detection device 50C of the present modification, the plurality of deviation amounts detected by simultaneous parallel processing described above may be subjected to average calculation or error removal. Performing these processes can enhance the accuracy and operation stability as compared with the case of calculating the amount of deviation by one operation.

Depending on application software for printing, for example, the conveyance speed may vary in accordance with the print speed. Even in such a case, the amount of deviation can be calculated simultaneously in parallel by using the lens array, thereby achieving highly accurate detection results.

Figure 10:
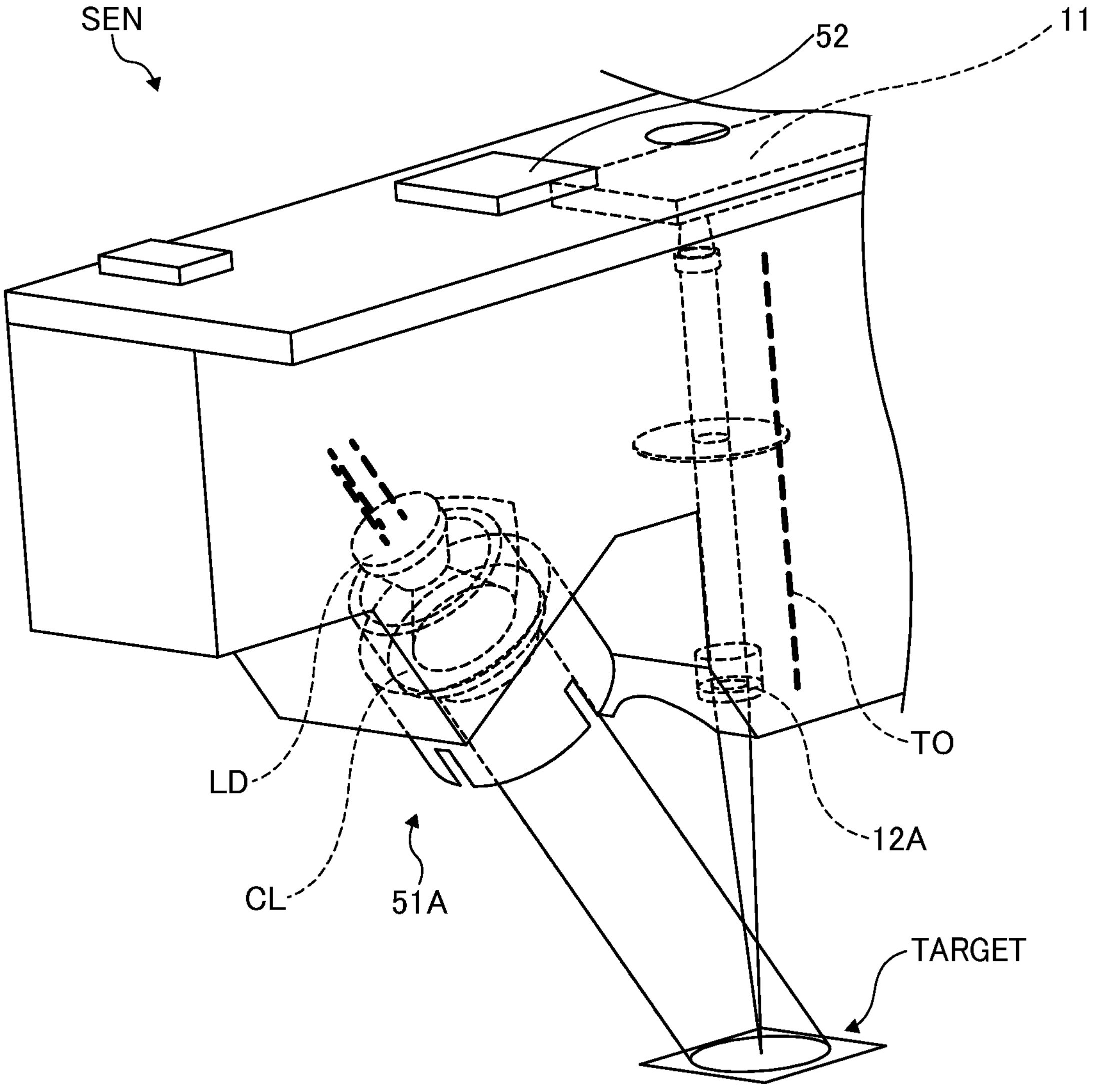
FIG. 10 is an external view of a part of a sensor device according to an embodiment of the present disclosure.

FIG. 10 is an external view of a part of a sensor device according to an embodiment of the present disclosure. In the example illustrated in FIG. 10, a part of an area sensor 11 and a first light source 51A, which are components included in a sensor device SEN, are illustrated, whereas the illustration of components related to a second light source 51B is omitted.

The illustrated sensor device SEN is configured to capture a speckle pattern or the like formed by applying light from a light source to a conveyance target object such as a web 120. Specifically, the first light source 51A includes optical systems such as a semiconductor laser light source (LD) and a collimating optical system (CL). The sensor device SEN further includes a complementary metal-oxide semiconductor (CMOS) image sensor which is an example of a sensor OS in order to capture an image in which a speckle pattern or the like appears, and a telecentric imaging optical system (TO) for condensing and forming the speckle pattern on the CMOS image sensor. The TO includes a first imaging lens 12A.

In the example of the illustrated configuration, the CMOS image sensors included in different sensor devices SEN capture images in which the speckle pattern appears at time TM1 and time TM2, for example. Then, a calculator 521 performs processing such as cross-correlation calculation on the basis of the image captured at the time TM1 and the image captured at the time TM2. The calculator 521 calculates the amount of movement of the conveyance target object between the time TM1 and the time TM2.

The first light source 51A and the second light source 51B according to the present embodiment are not limited to devices using laser light. For example, a light emitting diode (LED), an organic electro-luminescence (EL), or the like may be used as the first light source 51A or the second light source 51B. In the present embodiment, the hardware that performs correlation calculations is described as the calculator 521, but a field programmable gate array (FPGA) circuit mounted on any of the sensor devices may perform correlation calculations.

Returning to FIG. 4, the control device 52 controls the detection device 50 and other devices. Specifically, the control device 52 includes an image acquisition unit 411 and a shutter control unit 412. The control device 52 is an FPGA circuit, for example.

The shutter control unit 412 outputs a signal to the detection device 50 to control the shutter timing of the area sensor 11.

The image acquisition unit 411 outputs a signal to the detection device 50 to control acquisition of two-dimensional image data captured by the detection device 50. Next, the image acquisition unit 411 stores the acquired two-dimensional image data in the storage device 53.

The storage device 53 is a memory or the like. The storage device 53 stores the two-dimensional image data acquired by the image acquisition unit 411.

The calculator 521 includes an arithmetic device 54. The arithmetic device 54 is a microcomputer or the like. That is, the arithmetic device 54 performs arithmetic operations for achieving various types of processing using image data stored in the storage device 53.

The control device 52 and the arithmetic device 54 are, for example, a central processing unit (CPU), an electronic circuit, or the like. The control device 52 and the storage device 53 may be includes in the same device together with the arithmetic device 54. For example, the control device 52 and the arithmetic device 54 may be a single CPU.

The arithmetic device 54 may be implemented with, for example, a combination of a CPU, a read-only memory (ROM), and a random access memory (RAM). In the arithmetic device 54, the CPU uses the RAM as a working area and executes programs stored in the ROM. As described above, the arithmetic device 54 causes the CPU to execute a program stored in the ROM to implement the measurement unit 401, the calculation unit 402, the detection processing unit 403, the correction unit 404, the switching control unit 405, and the setting unit 406.

The measurement unit 401 has a counting function of counting the encoder pulses ENP output from the encoder ENC attached to the roller 230.

The calculation unit 402 calculates the position of the pattern of the web 120, the conveyance speed at which the web 120 is conveyed, and the amount of conveyance of the web 120, on the basis of the count value measured by the measurement unit 401, the image data obtained by imaging the vicinity of the A position and the image data obtained by imaging the vicinity of the B position stored in the storage device 53. The calculation unit 402 according to the present embodiment calculates the conveyance speed at which the web 120 is conveyed in each of modes (for example, an adjustment mode and a print mode) switchable by the switching control unit 405 described later. Methods of calculating the conveyance amount and the conveyance speed may be any calculation methods including known methods in the related art.

The calculation unit 402 outputs data of time difference Δt indicating a shutter timing to the shutter control unit 412. That is, the calculation unit 402 outputs a camera trigger indicating the shutter timing to the shutter control unit 412 so that the image indicating the "A position" and the image indicating the "B position" are captured at imaging times with the time difference Δt.

<Description of Speckle Pattern>

The web 120 is a member having a scattering property on surface or inside. As a result, when the web 120 is irradiated with laser light, the reflection light is diffusely reflected. This diffuse reflection forms a pattern on web 120. That is, the pattern is a speckle pattern with spots called "speckles". As a result, when the web 120 is imaged, an image illustrating the speckle pattern is obtained. Since the position of the speckle pattern can be known from this image, where the predetermined position of the web 120 is can be detected. The speckle pattern is generated because the irradiated laser light is interfered with concave and convex portions formed on the surface or inside of the web 120.

When the web 120 is conveyed, the speckle pattern on the web 120 is also conveyed together. As a result, when the same speckle pattern is detected at different times, the conveyance amount is obtained. That is, when the same speckle pattern is detected and the conveyance amount of the pattern is determined, the calculation unit 402 can obtain the conveyance amount of the web 120. When the determined conveyance amount is converted per unit time, the calculation unit 402 can obtain the moving speed (including the conveyance speed) of the web 120. The movement amount or the movement speed (including the conveyance speed) to be obtained is not limited to the conveyance direction of the web 120. Since the area sensor 11 outputs two-dimensional image data, the calculation unit 402 can obtain a two-dimensional moving amount or moving speed.

As illustrated in FIG. 4, the first imaging lens 12A and the second imaging lens 12B are installed at a specific sparing in the conveyance direction 10. The web 120 is imaged via the first imaging lens 12A and the second imaging lens 12B near their respective positions (for example, near the position A and near the position B).

The interval at which the shutter control unit 412 images the web 120 is defined as time difference Δt. The calculation unit 402 calculates the conveyance speed V (mm/s) of the web 120 based on the speckle pattern represented in the captured image data.

For example, when the conveyance speed is V [mm/s] and the distance between the first imaging lens 12A and the second imaging lens 12B in the conveyance direction 10 is L [mm], the following Equation (1) is established.

$$\Delta t = L/V \quad (1)$$

In Equation (1) described above, the distance L [mm] is an interval between the first imaging lens 12A and the second imaging lens 12B, and thus is set in advance. Therefore, the calculation unit 402 can calculate the conveyance speed V [mm/s] by substituting the determined time difference Δt into Equation (1). The calculation unit 402 can also calculate the conveyance amount according to the elapsed time.

As described above, the liquid discharge apparatus 110 can accurately obtain the position of the web 120 in the conveyance direction, the conveyance amount, and the conveyance speed, or a combination thereof, based on the speckle pattern. The liquid discharge apparatus 110 may output any two or more of the position of the web 120 in the conveyance direction, the conveyance amount, and the conveyance speed.

The area sensor 11 may detect the position of the web 120 in a direction (main scanning direction) orthogonal to the conveyance direction. That is, the sensor may be used to detect the positions of the web 120 in the conveyance direction and the direction orthogonal to the conveyance direction. Such use of the sensor can reduce the cost in each direction. In addition, the number of sensors used for detecting the position of the web 120 can be reduced, thereby achieving space saving.

The detection processing unit 403 detects the amount of deviation between the positions where the liquids are discharged by the plurality of liquid discharge heads, based on the image data captured for each area sensor 11 (an example of an image sensor).

Specifically, the detection processing unit 403 has a function of calculating the amount of deviation ΔL with respect to an ideal inter-sensor distance L from "position A" to "position B" based on image data captured for each area sensor 11 serving as an image sensor.

For example, the detection processing unit 403 performs a cross-correlation arithmetic operation on an image D1(*n*) indicating the "A position" and an image D2(*n*) indicating the "B position" captured by the sensor device SEN. Below, images generated by the cross-correlation arithmetic operation will be referred to as correlation image. For example, the detection processing unit 403 calculates a deviation amount ΔD (n) on the basis of the correlation image. For example, the cross-correlation arithmetic operation is expressed by the following Equation (2). It is assumed that the image data captured at "position A" is denoted as D1(*n*) and the image data captured at "position B" is denoted as D2(*n*).

$$D1\ xcorr\ D2^* = F{-}1[F[D1]\cdot F[D2]^*] \qquad (2)$$

In Equation (2), the Fourier transform is represented by "F[ ]", and the inverse Fourier transform is represented by "F−1[ ]". In Equation (2), the complex conjugate is indicated by "*", and the cross-correlation operation is indicated by "xcorr".

The detection processing unit 403 performs the cross-correlation calculation "D1 xcorr D2" on the image data D1 and D2 according to Equation (2) to generate image data indicating a correlation image (hereinafter, also referred to as correlation image data). If the image data D1 and D2 are two-dimensional image data, the correlation image data is also two-dimensional image data. If the image data D1 and D2 are one-dimensional image data, the correlation image data is also one-dimensional image data.

The correlation image data is image data indicating a correlation between the image data D1 and the image data D2 by luminance. Specifically, the correlation image data represents luminance at a correlation peak that, as the degree of coincidence between the image data D1 and D2 is higher, becomes steeper with increasing proximity to the center of the correlation image. In other words, if the image data D1 and the image data D2 coincide with each other, the peak of the luminance is at the center position in the correlation image data becomes. That is, the deviation amount ΔD(n) can be calculated from the difference between the position of the luminance peak and the center position in the correlation image data. When the correlation image data is two-dimensional, the deviation amount ΔD(n) includes not only the deviation amount in the conveyance direction but also the deviation amount in the main scanning direction.

If a broad luminance distribution is a disadvantage in the correlation image, for example, a phase-only correlation method may be used. For example, the following Equation (3) may be used as the phase-only correlation method.

$$D1\ xcorr\ D2^* = F{-}1[P(F[D1]]\cdot P[F[D2]^*]] \qquad (3)$$

In Equation (3), "P[ ]" indicates that only the phase is extracted at the complex amplitudes. The amplitudes are all "1".

By using Equation (3), the detection processing unit 403 can calculate the deviation amount ΔD(n) on the basis of the correlation image even in a broad luminance distribution.

The correction unit 404 corrects the timings for discharging the ink from the liquid discharge head units based on the deviation amount ΔD(n) detected by the detection processing unit 403. The correction unit 404 according to the present embodiment outputs signals for correcting the timings for discharging the ink to the controller 520.

The controller 520 controls the discharge of liquid from the black liquid discharge head unit 210K and the cyan liquid discharge head unit 210C based on the timing of discharging ink (an example of liquid) indicated by the signal. The timing at which liquid is discharged is controlled by a first control signal SIG1 for the black liquid discharge head unit 210K, a second control signal SIG2 for the cyan liquid discharge head unit 210C, and other signals output from the controller 520.

The switching control unit 405 switches between an adjustment mode and a print mode. In the present embodiment, the detection processing unit 403 detects the deviation amount in either the adjustment mode or the print mode.

The adjustment mode (an example of first control) is a mode for adjustment before the liquid discharge apparatus 110 performs printing. In the adjustment mode, the web 120 is conveyed at a first conveyance speed (for example, 200 mm/s) while the web 120 is imaged with a first image size (for example, 500 pixels×500 pixels) in the area sensor 11. Since the adjustment mode (an example of the first control) is a mode for performing adjustment, the print speed (an example of a first conveyance speed) for conveying the web 120 is set to be slower than the print speed in the print mode, and the image size acquired by the area sensor 11 is set to be larger than the image size in the print mode.

In the adjustment mode, the deviation amount can be detected with high accuracy. However, since the number of pixels used for capturing the image data is large, the image sensor processing speed at which the image data is read by the image capturing becomes slow. Therefore, it is difficult to perform printing at a high speed while maintaining the detection accuracy of the deviation amount. Therefore, in the present embodiment, the print mode is provided.

The print mode (an example of second control) is a mode for the liquid discharge apparatus 110 to perform printing. In the print mode, if the area sensor 11 captures an image of the web 120 (an example of a conveyance target object) with a second image size (for example, 100 pixels×100 pixels) having a smaller number of pixels than a first image size (for example, 500 pixels×500 pixels), the web 120 is conveyed at a second conveyance speed (for example, 3000 mm/s) faster than the first conveyance speed (for example, 200 mm/s).

In the print mode, since the web 120 (an example of a conveyance target object) is imaged with the second image size (for example, 100 pixels×100 pixels), a possible range of imaging is narrower than a possible range of imaging in the adjustment mode.

The setting unit 406 sets the positions of the pixels in the area sensor 11 used for imaging in the print mode (an example of the second control) according to the deviation amount detected by the detection processing unit 403 based on the image data captured with the first image size in the adjustment mode (an example of the first control).

The setting unit 406 sets the positions of the pixels in the image sensor corresponding to the region downstream in the conveyance direction among the regions where the liquids are discharged by the plurality of liquid discharge head units 210K, 210C, 210M, and 210Y in the print mode. This setting will be described in detail later.

The controller 520 controls the liquid discharge head units 210K, 210C, 210M, and 210Y and other devices based on signals from the calculator 521, for example. Examples of the control include correction of the timings for discharging ink.

The controller 520 controls the plurality of liquid discharge head units 210K, 210C, 210M, and 210Y to discharge liquids. The controller 520 outputs the first control signal SIG1 for black, the second control signal SIG2 for cyan, or other data to cause the liquid discharge head units 210K, 210C, 210M, and 210Y to discharge the liquids at timings based on the signals from the calculator 521.

<Description of Controller 520>

The controller 520 has a configuration described below, for example.

Figure 11:
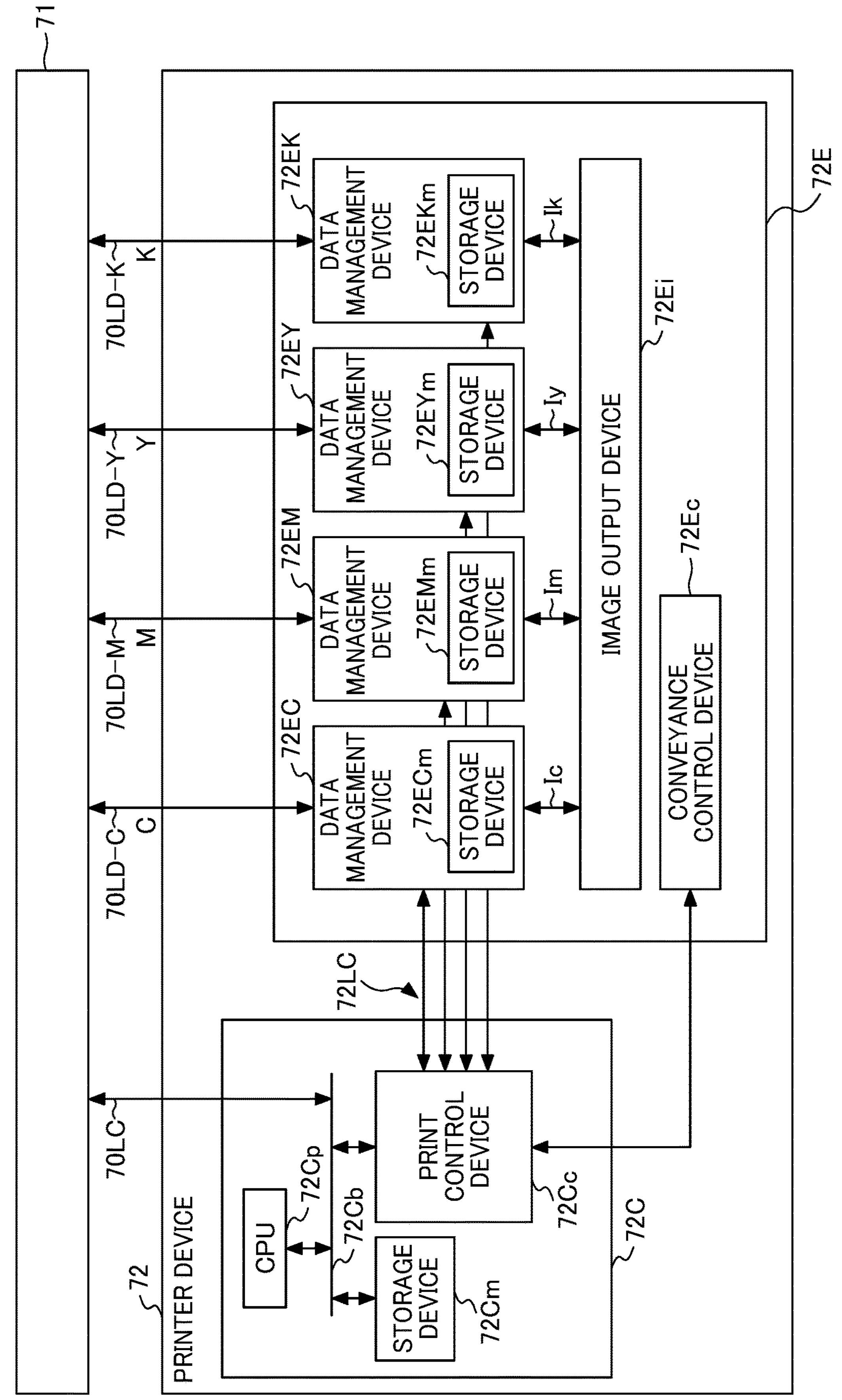
FIG. 11 is a block diagram illustrating a hardware configuration of a controller according to an embodiment of the present disclosure.

FIG. 11 is a block diagram illustrating the hardware configuration of the controller 520 according to an embodiment of the present disclosure. For example, the controller 520 includes a host device 71, which is an information processing device or the like, and a printer device 72. In the illustrated example, the controller 520 causes the printer device 72 to form an image on a recording medium on the basis of image data and control data input from the host device 71.

The host device 71 is, for example, a personal computer. The printer device 72 includes a printer controller 72C and a printer engine 72E.

The printer controller 72C controls the operation of the printer engine 72E. First, the printer controller 72C transmits and receives control data to and from the host device 71 via a control line 70LC. The printer controller 72C further transmits and receives control data to and from the printer engine 72E via a control line 72LC. Through the transmission and reception of the control data, for example, various printing conditions indicated by the control data are input to the printer controller 72C, and the printer controller 72C stores the printing conditions and the like in a register or the like. Next, the printer controller 72C controls the printer engine 72E on the basis of the control data, and performs image formation according to print job data, that is, the control data.

The printer controller 72C includes a CPU 72Cp, a print control device 72Cc, and a storage device 72Cm. The CPU 72Cp and the print control device 72Cc are connected by a bus 72Cb to communicate with each other. The bus 72Cb is connected to the control line 70LC via a communication interface (I/F) or the like.

The CPU 72Cp controls the entire operation of the printer device 72 by a control program or the like. That is, the CPU 72Cp is an arithmetic operation device and a control device.

The print control device 72Cc transmits and receives data indicating a command, a status, or the like to and from the printer engine 72E based on control data transmitted from the host device 71. Accordingly, the print control device 72Cc controls the printer engine 72E.

Data lines 70LD-C, 70LD-M, 70LD-Y, and 70LD-K, that is, a plurality of data lines is connected to the printer engine 72E. The printer engine 72E receives image data from the host device 71 via the plurality of data lines. Next, the printer engine 72E forms an image in each color under the control of the printer controller 72C.

The printer engine 72E includes data management devices 72EC, 72EM, 72EY, and 72EK, that is, a plurality of data management devices. The printer engine 72E also includes an image output device 72Ei and a conveyance control device 72Ec.

Figure 12:
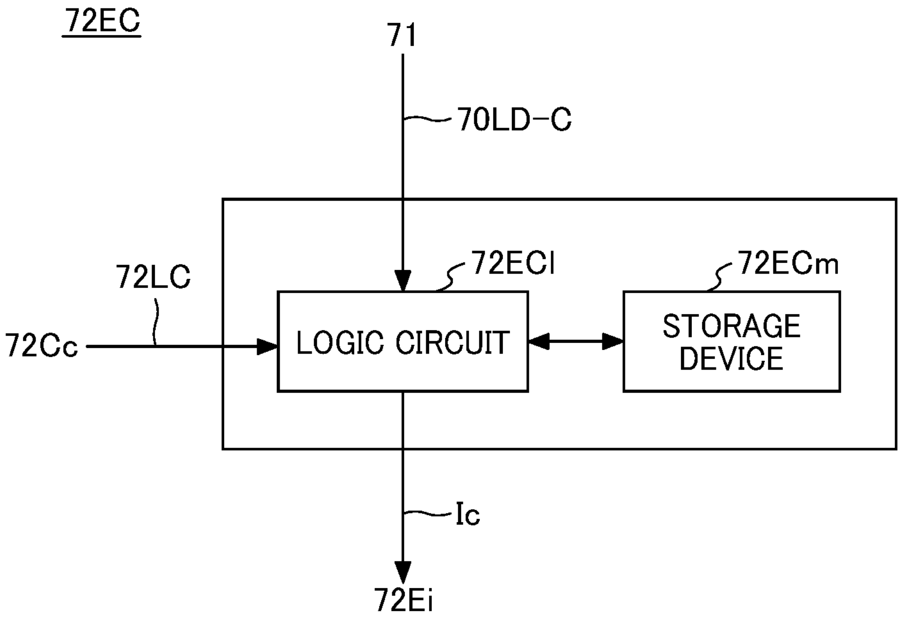
FIG. 12 is a block diagram of a hardware configuration of a data management device included in a controller according to an embodiment of the present disclosure.

FIG. 12 is a block diagram of the hardware configuration of a data management device included in the controller 520 according to an embodiment of the present disclosure. For example, the plurality of data management apparatuses has the same configuration. Below, assuming that the data management devices have the same configuration, the data management device 72EC will be described as an example. Therefore, redundant description may be omitted.

The data management device 72EC includes a logic circuit 72ECl and a storage device 72ECm. As illustrated, the logic circuit 72ECl is connected to the host device 71 via the data line 70LD-C. The logic circuit 72ECl is connected to the print control device 72Cc via the control line 72LC. The logic circuit 72ECl is implemented with an application specific integrated circuit (ASIC), a programmable logic device (PLD), or the like.

The logic circuit 72ECl stores the image data from the host device 71 in the storage device 72ECm on the basis of a control signal from the printer controller 72C (FIG. 11).

The logic circuit 72ECl reads image data for cyan Ic from the storage device 72ECm on the basis of a control signal from the printer controller 72C. Next, the logic circuit 72ECI sends the read image data for cyan Ic to the image output device 72Ei.

The storage device 72ECm desirably has a capacity capable of storing image data of about 3 pages. If the storage device 72ECm is capable of storing image data of about 3 pages is stored, the storage device 72ECm can store image data from the host device 71, image data during image formation, and image data for next image formation.

Figure 13:
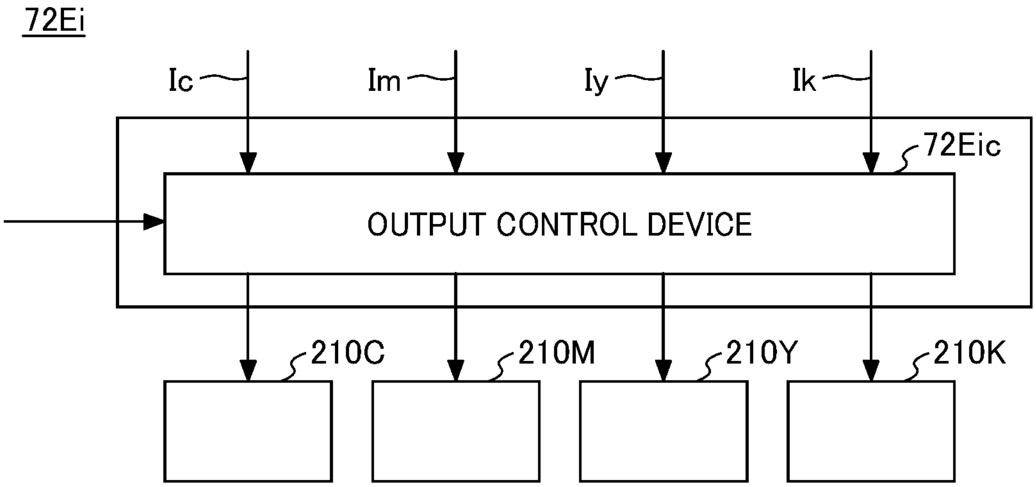
FIG. 13 is a block diagram of a hardware configuration of an image output device included in a controller according to an embodiment of the present disclosure.

FIG. 13 is a block diagram of the hardware configuration of an image output device included in the controller 520 according to an embodiment of the present disclosure. As illustrated, the image output device 72Ei controls the output control device 72Eic, and the black liquid discharge head unit 210K, the cyan liquid discharge head unit 210C, the magenta liquid discharge head unit 210M, and the yellow liquid discharge head unit 210Y, which are liquid discharge head units of the respective colors.

The output control device 72Eic outputs the image signals of the respective colors to the liquid discharge head units 210K, 210C, 210M, and 210Y of the respective colors. That is, the output control device 72Eic controls the liquid discharge head units 210K, 210C, 210M, and 210Y of the respective colors based on the input image signals Ik, Ic, Im, and Iy.

The output control device 72Eic controls the plurality of liquid discharge head units 210K, 210C, 210M, and 210Y simultaneously or individually. In other words, the output control device 72Eic receives the input of the timing, and performs control or the like to change the timing at which to cause the liquid discharge head units to discharge the liquids. The output control device 72Eic may control any of the liquid discharge head units based on a control signal from the printer controller 72C. Furthermore, the output control device 72Eic may control any of the liquid discharge head units based on an operation or the like by a user.

The printer device 72 has different paths, that is, a path for inputting image data from the host device 71 and a path used for transmission and reception between the host device 71 and the printer device 72 based on the control data as an example.

The printer device 72 may form an image in black only, for example. In the case of forming an image in black only, in order to increase the speed of the image formation, for example, the printer device 72 may include one data management device and four black liquid discharge head units. Thus, the black ink is discharged by each of the plurality of black liquid discharge head units. As a result, image formation can be performed faster than in a configuration in which one black liquid discharge head unit is used.

The conveyance control device 72Ec is a motor or the like that conveys the web 120. For example, the conveyance control device 72Ec controls motors or the like connected to the rollers or the like to convey the web 120.

Processing Example

Figure 14:
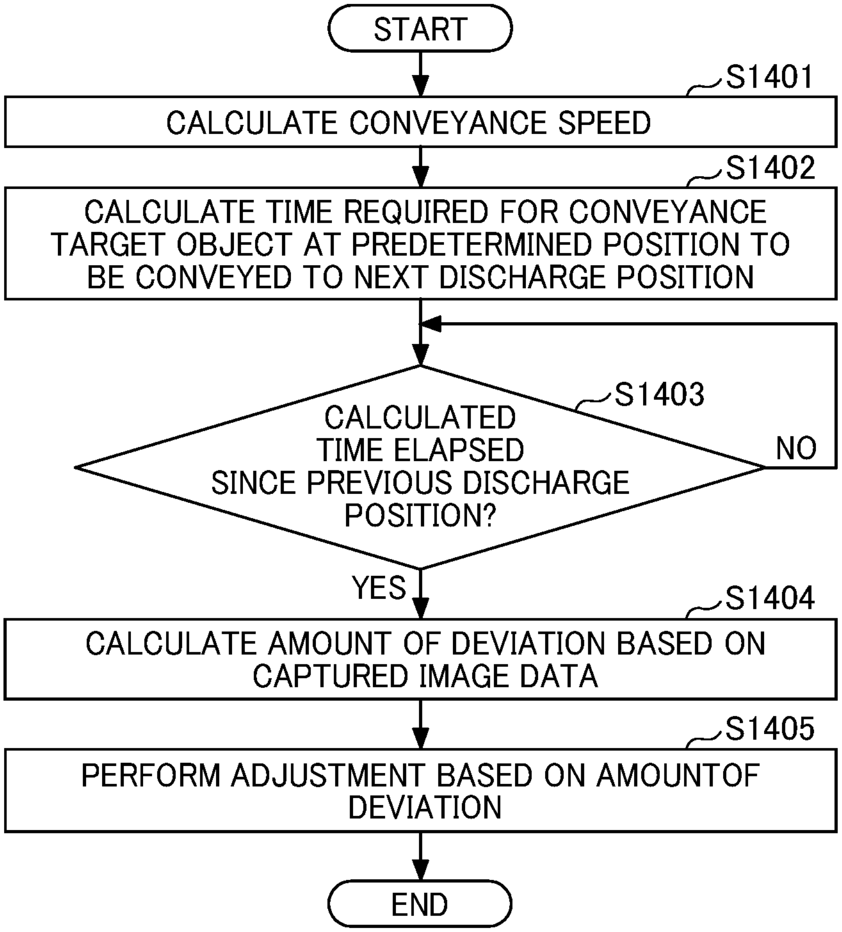
FIG. 14 is a flowchart of a processing example according to an embodiment of the present disclosure.

FIG. 14 is a flowchart of a processing example according to an embodiment of the present disclosure. For example, the liquid discharge apparatus 110 performs the following general processing.

It is assumed that the liquid discharge apparatus 110 has acquired image data indicating an image to be formed on the web 120 in advance by the black liquid discharge head unit 210K, for example. The liquid discharge apparatus 110 performs the general processing illustrated in FIG. 14 based on the acquired image data.

FIG. 14 illustrates the processing for one liquid discharge head unit. That is, FIG. 14 illustrates the processing related to the black liquid discharge head unit 210K, for example. Description of processing on the liquid discharge head units for the other colors will be omitted, on the assumption that, for example, similar processing is performed on the liquid discharge head units for the other colors in parallel or before or after the processing illustrated in FIG. 14.

The calculation unit 402 in the liquid discharge apparatus 110 detects the position of the pattern on the web 120 and calculates the conveyance amount and the conveyance speed, or a combination thereof (S1401).

The calculation unit 402 calculates the time required for the conveyance target conveyance target object from the detected position to the next discharge position (S1402).

In S1401 and S1402, the liquid discharge head unit on the upstream side (for example, black with respect to cyan) performs processing based on the timing at which the liquid is discharged.

Subsequently, the shutter control unit 412 determines whether the time calculated in S1402 has elapsed since the previous imaging (S1403). When the shutter control unit 412 determines that the time has not elapsed (S1403: No), the shutter control unit 412 makes the determination in S1403 again.

On the other hand, when the shutter control unit 412 determines that the time calculated in S1402 has elapsed (S1403: Yes), the shutter control unit 412 performs imaging control, and the detection processing unit 403 calculates the deviation amount on the basis of the image data captured by the shutter control unit 412 and the image data acquired in advance (S1404).

Step S1404 is performed at a position corresponding to the liquid discharge head unit downstream of the discharge position in steps S1401 and S1402 (for example, the cyan liquid discharge head unit 210C). Steps S1404 to S1405 are performed after the upstream liquid discharge head unit discharges the liquid and before the downstream liquid discharge head unit discharges the liquid.

The correction unit 404 and the setting unit 406 adjust the discharge timing based on the calculated deviation amount (S1405).

An example of adjusting the discharge timing has been described with reference to FIG. 14. In order to achieve the adjustment, the adjustment is preferably performed so that the region where the liquid is discharged is included in the imaging range of the area sensor 11. Then, adjustment of the pixel positions in the area sensor 11 used for imaging will be described.

Figure 15:
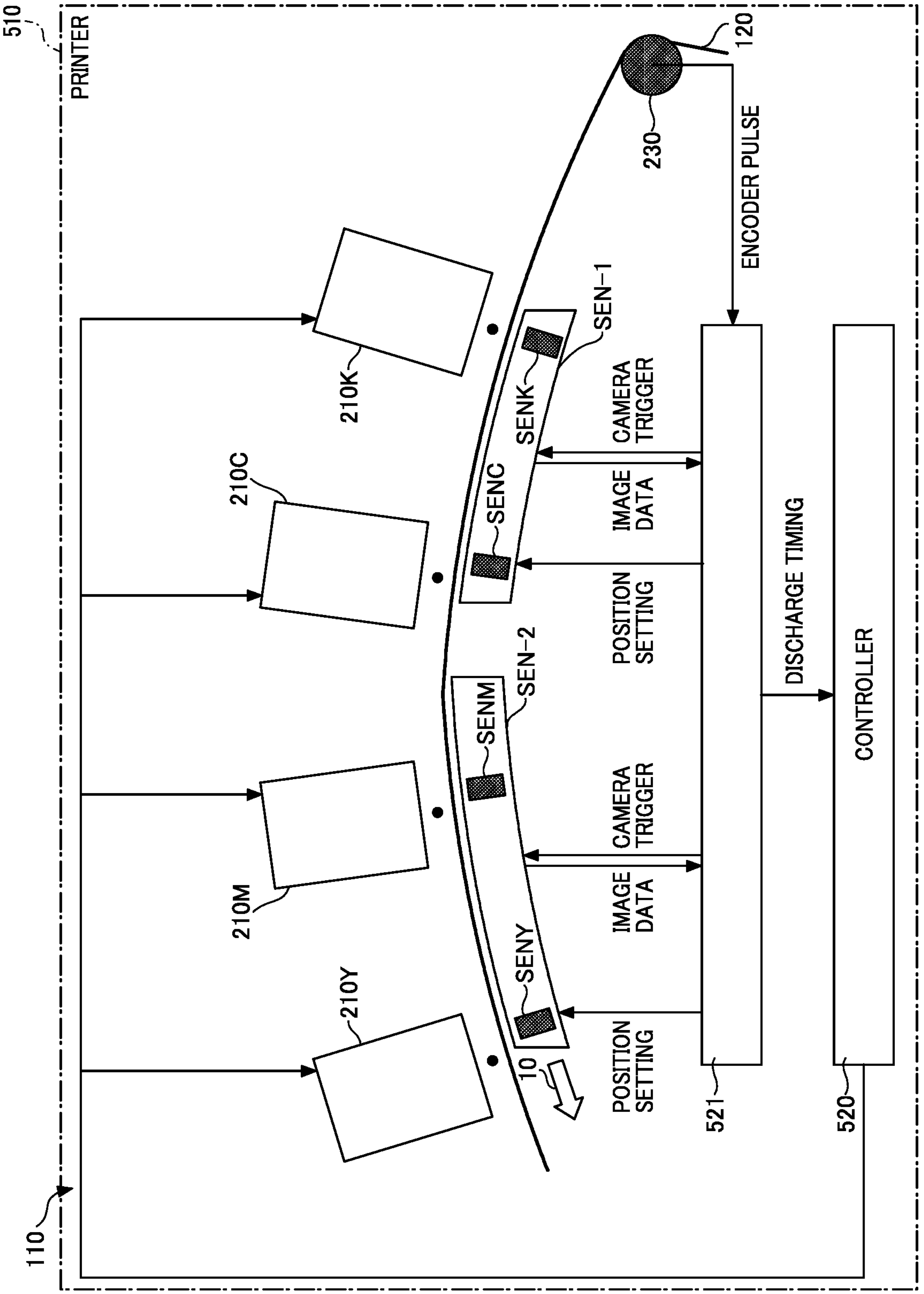
FIG. 15 is a diagram illustrating a flow of a signal at the time of detecting the amount of deviation in the liquid discharge apparatus according to an embodiment of the present disclosure.

FIG. 15 is a diagram illustrating a flow of a signal at the time of detecting the amount of deviation in the liquid discharge apparatus according to an embodiment of the present disclosure. In the liquid discharge apparatus 110 illustrated in FIG. 15, sensor devices SEN-1 and SEN-2 are arranged. Each of the sensor device SEN-1 and the sensor device SEN-2 includes a detection device 50, a control device 52, and a storage device 53 as illustrated in FIG. 4. Then, the area sensor 11 of the sensor device SEN-1 functions as the sensor devices SENC and SENK, and the area sensor 11 of the sensor device SEN-2 functions as the sensor devices SENM and SENY.

The calculator 521 outputs a camera trigger to the sensor devices SEN-1 and SEN-2. Thus, the shutter control units 412 of the sensor devices SEN-1 and SEN-2 perform shutter control. Then, the calculator 521 acquires two pieces of image data (black and cyan) output from the sensor device SEN-1 and two pieces of image data magenta and yellow) output from the sensor device SEN-2.

The calculator 521 generates a camera trigger of the area sensor 11 based on the encoder pulse. The generated camera trigger is output to the sensor devices SEN-1 and SEN-2.

The detection processing unit 403 of the calculator 521 calculates the phase-only correlation of the image data captured by the area sensor 11 functioning as the downstream sensor devices SENC, SENM, and SENY with respect to the image data captured by the area sensor 11 functioning as the most upstream sensor device SENK, and calculates the amount of deviation between the sensors in the main scanning direction or the conveyance direction.

The setting unit 406 sets the positions of the pixels used for imaging in the area sensor 11 on the basis of the calculated deviation amount.

The calculator 521 transmits information indicating the positions of the pixels set by the setting unit 406 to the sensor devices SEN-1 and SEN-2. Accordingly, the pixels used for imaging in the area sensor 11 can be determined. The calculator 521 outputs the discharge timing corrected by the correction unit 404 to the controller 520. As a result, adjustment of the discharge timing according to the deviation amount can be achieved.

Figure 16:
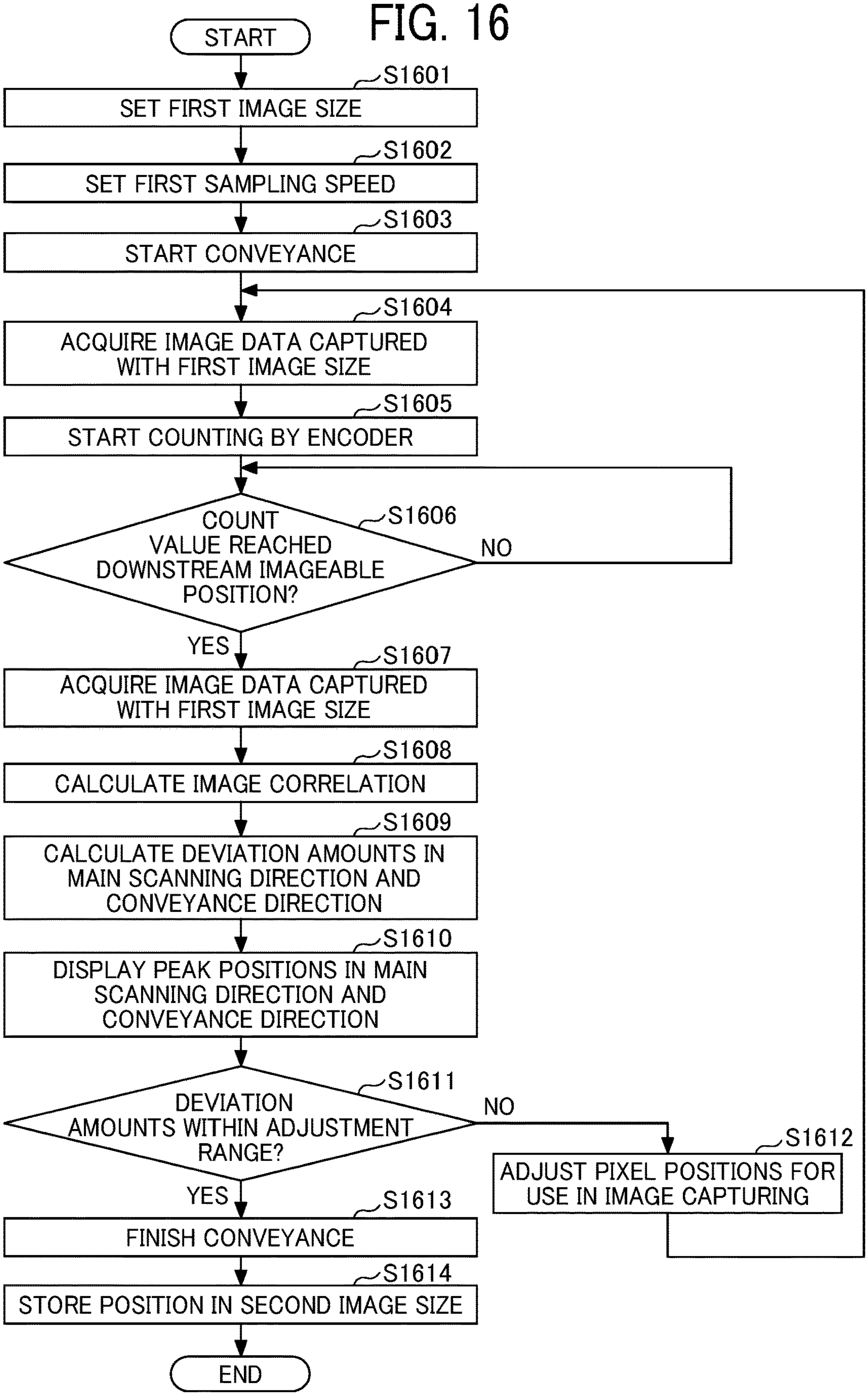
FIG. 16 is a flowchart of a process performed by the liquid discharge apparatus in an adjustment mode according to the present embodiment.

Next, processing performed by the liquid discharge apparatus 110 according to the present embodiment in the adjustment mode will be described. FIG. 16 is a flowchart of processing performed by the liquid discharge apparatus 110 according to the present embodiment in the adjustment mode.

In the adjustment mode, the switching control unit 405 of the calculator 521 according to the present embodiment sets the first image size used for imaging by the area sensor 11 of the sensor device SEN on the basis of the setting for the adjustment mode calculated in advance (S1601). The switching control unit 405 further sets the first sampling speed based on the setting for the adjustment mode (S1602). The sampling speed is a speed indicating the number of times when sampling is performed (the number of times of when imaging is performed) per second.

FIG. 17 is a table containing information set for each mode settable in the liquid discharge apparatus 110 according to an embodiment of the present disclosure. As illustrated in FIG. 17, the table of settings for each mode contains settings of image size, image sensor processing speed, print speed, detection resolution, and sampling speed for each of the adjustment mode and the print mode. The setting table is stored in a non-volatile storage medium included in the calculator 521, for example.

As illustrated in FIG. 17, in the adjustment mode, the first image size is set to "500 pixels×500 pixels", and the first sampling speed is set to "4 frames/sec".

As illustrated in FIG. 17, in the adjustment mode, the first image size is "500 pixels×500 pixels", the first image sensor processing speed is "5 (frames/sec)", the first print speed is "200 mm/s", the first detection resolution is "50 mm/sheet", and the first sampling speed is "4 (frames/sec)".

As described above, the first sampling speed "4 (frames/sec)" is lower than the second image sensor processing speed "5 (frames/sec)", thus allowing appropriate measurement while reducing the occurrence of a delay in acquiring image data. Then, in the case of the first sampling speed "4 (frames/sec)" and the first print speed "200 mm/s", the sensor device SEN according to the present embodiment can capture an image of the same region as imaged on the upstream side, also on the downstream side.

In other words, in the adjustment mode, the first print speed (an example of the first conveyance speed) is set such that the number of frames to be imaged per second (an example of the predetermined time) is decreased as compared with the number of frames per second (an example of the predetermined time) during which image data can be acquired when the area sensor 11 (an example of the image sensor) captures an image in the first image size, and that the region imaged on the upstream side can be imaged also on the downstream side even with the decreased number of frames.

The first sampling speed "4 (frames/sec)" of the present embodiment is determined based on the first print speed "200 mm/s" and the distance between the liquid discharge head units. That is, the first sampling speed "4 (frames/sec)" is determined such that after image capturing by the liquid discharge head unit on the upstream side, the web 120 is conveyed at the print speed to a position where image capturing can be performed by the liquid discharge head unit on the downstream side. In other words, the first sampling speed "4 (frames/sec)" is set so as to allow image capturing with the time difference Δt described above. The foregoing condition is satisfied not only in the adjustment mode but also in the print mode.

Then, the controller 520 performs control to start conveyance of the web 120 (S1603).

The calculator 521 acquires image data captured with the first image size from the sensor device SEN (S1604).

The measurement unit 401 starts counting by the encoder pulse ENP output from the encoder ENC (S1605).

The measurement unit 401 determines whether the value of count by the encoder pulse ENP has reached a value indicating a position where image capturing can be performed on the downstream side (S1606). When determining that the count value has not reached (S1606: No), the measurement unit 401 repeats the determination in S1606.

On the other hand, when the measurement unit 401 determines that the count value has reached a value indicating the position where image capturing can performed on the downstream side (S1606: Yes), the arithmetic device 54 outputs the camera trigger to the sensor device SEN to acquire the image data captured with the first image size (S1607).

The detection processing unit 403 performs cross-correlation calculation (image correlation) on the basis of the image data captured on the upstream side and the image data captured on the downstream side, and generates correlation image data (S1608).

The detection processing unit 403 calculates the deviation amount in the main-scanning direction and the conveyance direction on the basis of the correlation image data (S1609).

The calculator 521 outputs the correlation image data to the host device 71 of the controller 520, and the host device 71 displays peak positions in the main scanning direction and the conveyance direction (positions with luminance peaks) serving as a reference for correcting the deviation amount based on the luminance of the correlation image data (S1610). Such a configuration allows the user to grasp how much the deviation is.

The detection processing unit 403 determines whether the deviation amount calculated in S1609 is within the adjustment range (S1611). When the detection processing unit 403 determines that the misalignment amount is not within the adjustment range (S1611: No), the setting unit 406 adjusts the positions of the pixels in the area sensor 11 used for imaging (S1612), and performs the processing from S1604 again.

On the other hand, when the detection processing unit 403 determines that the misalignment amount is within the adjustment range (S1611: Yes), the controller 520 ends the conveyance (S1613).

The setting unit 406 stores the positions of the pixels in the area sensor 11 used for current imaging in a non-volatile storage medium of the calculator 521 (S1614).

By performing the above-described processing, the positions of the pixels in the area sensor 11 used for imaging can be adjusted in the adjustment mode. In the print mode, image capturing is performed based on the positions of the pixels adjusted in the adjustment mode.

Figure 18:
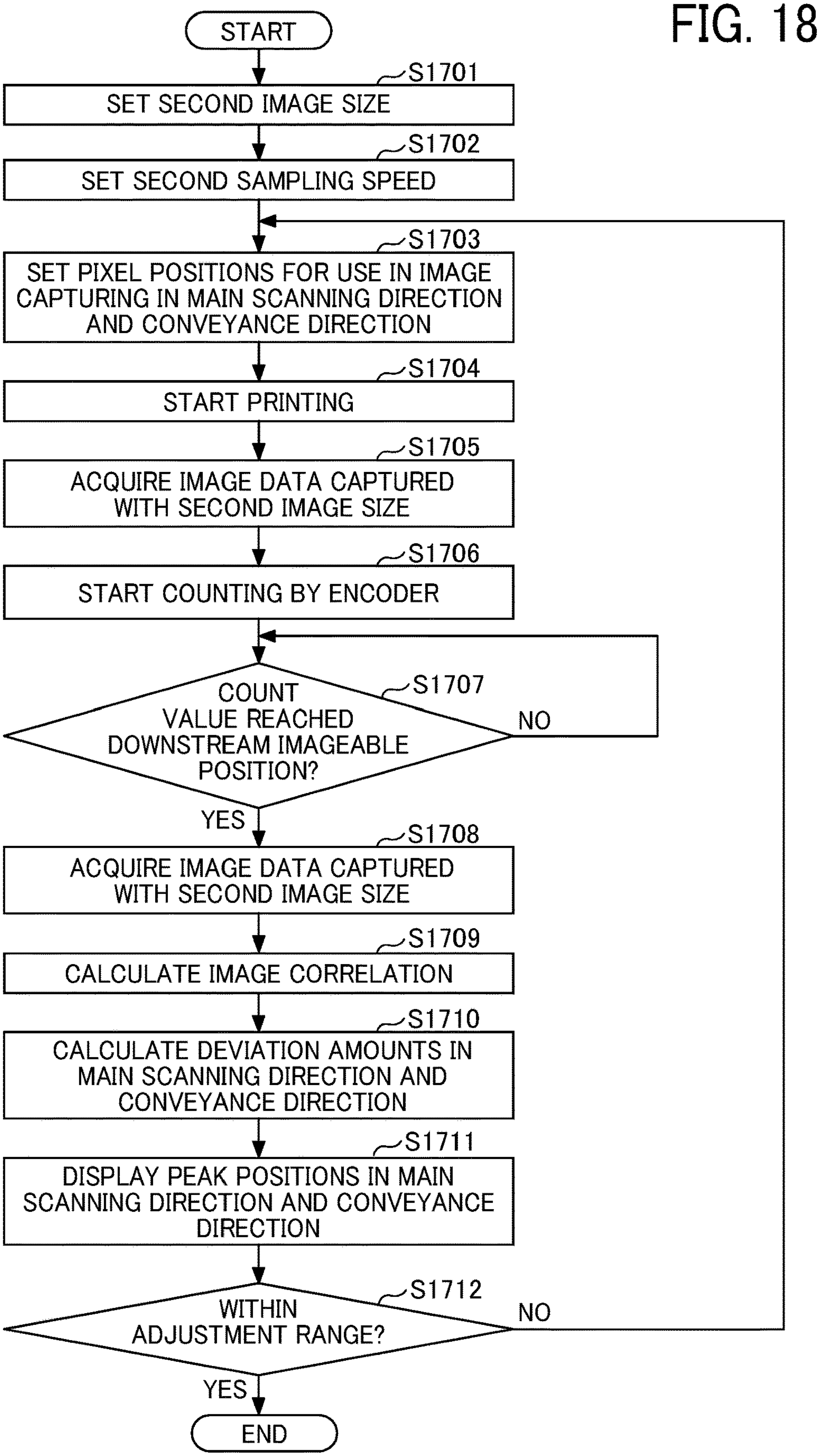
FIG. 18 is a flowchart of a process performed by the liquid discharge apparatus in a print mode according to an embodiment of the present disclosure.

Next, processing performed by the liquid discharge apparatus 110 according to the present embodiment in the print mode will be described. FIG. 18 is a flowchart of a process performed by the liquid discharge apparatus 110 in the print mode according to an embodiment of the present disclosure.

In the print mode, the switching control unit 405 of the calculator 521 according to the present embodiment sets the second image size used for imaging by the area sensor 11 of the sensor device SEN on the basis of the setting for the print mode calculated in advance (S1701). The switching control unit 405 further sets the second sampling speed based on the setting for the print mode (S1702).

As illustrated in FIG. 17, in the print mode, the second image size is set to "100 pixels×100 pixels", and the second sampling speed is set to "120 frames/sec".

As illustrated in FIG. 17, in the case of the print mode, the second image size is 100 pixels×100 pixels, the second image sensor processing speed is 125 (frames/sec), the second printing speed is 3000 mm/s, the second detection resolution is 25 mm/sheet, and the second sampling speed is "120 (frames/sec). The second printing speed of 3000 mm/s is the maximum speed at which the liquid discharge apparatus 110 can convey the web 120.

In the print mode, the second image size of 100 pixels×100 pixels is set such that when the web 120 is conveyed at the second print speed of 3000 mm/s, image data can be obtained from the area sensor 11 (an example of an image sensor) during a period from image capturing of the speckle pattern (an example of a predetermined region) on the upstream side in the conveyance direction to image capturing of the speckle pattern on the downstream side in the conveyance direction.

As described above, the second sampling speed of 120 (frames/sec) is lower than the second image sensor processing speed of 125 (frames/sec), thus allowing appropriate measurement while reducing the occurrence of a delay in acquiring image data.

In other words, in the print mode, the second print speed (an example of the second conveyance speed) is set such that the number of frames to be imaged per second (an example of the predetermined time) is decreased as compared with the number of frames per second (an example of the predetermined time) during which image data can be acquired when the area sensor 11 (an example of the image sensor) captures an image with the second image size, and that the region imaged on the upstream side can be imaged also on the downstream side even with the decreased number of frames.

In the area sensor 11, the setting unit 406 sets the positions of the pixels used for imaging for each of the main scanning direction and the conveyance direction (S1703). In the initial state, the setting unit 406 performs setting based on the positions stored in the non-volatile storage medium in S1614 of FIG. 16.

Then, the controller 520 controls the start of printing (S1704).

The calculator 521 acquires image data captured with the second image size from the sensor device SEN (S1705).

The measurement unit 401 starts counting by the encoder pulse ENP output from the encoder ENC (S1706).

The measurement unit 401 determines whether the value of count by the encoder pulse ENP has reached a value indicating a position where image capturing can be performed on the downstream side (S1707). When determining that the count value has not arrived (S1707: No), the measurement unit 401 repeats the determination in S1707.

On the other hand, when the measurement unit 401 determines that the count value has reached a value indicating the position where image capturing can performed on the downstream side (S1707: Yes), the arithmetic device 54 outputs the camera trigger to the sensor device SEN to acquire the image data captured with the second image size (S1708).

The detection processing unit 403 performs cross-correlation calculation (image correlation) on the basis of the image data captured on the upstream side and the image data captured on the downstream side, and generates correlation image data (S1709).

The detection processing unit 403 calculates the deviation amount in the main-scanning direction and the conveyance direction on the basis of the correlation image data (S1710).

The calculator 521 outputs the correlation image data to the host device 71 of the controller 520, and the host device 71 displays peak positions in the main scanning direction and the conveyance direction (positions with luminance peaks) serving as a reference for correcting the deviation amount based on the luminance of the correlation image data (S1711). Such a configuration allows the user to grasp how much the deviation is.

The detection processing unit 403 determines whether the deviation amount calculated in S1710 is within the adjustment range (S1712). When the detection processing unit 403 determines that the deviation amount is not within the adjustment range (S1712: No), the setting unit 406 sets the positions of the pixels used for imaging in each of the main scanning direction and the conveyance direction on the basis of the deviation amount calculated in S1710 (S1703), and executes the subsequent processing.

On the other hand, when the detection processing unit 403 determines that the deviation amount calculated in S1710 falls within the adjustment range (S1712: Yes), the adjustment of the positions of the pixels used for printing by the area sensor 11 is ended. Printing is continuously performed. S1705 to S1712 may be repeatedly performed at predetermined time intervals.

In the print mode described above, the print speed “3000 mm/s” and the sampling speed “120 (frames/sec)” are increased as compared with the adjustment mode, but the second image size is as small as “100 pixels×100 pixels”, so that the deviation can be detected without a delay due to the processing load. In addition, since the initial adjustment is performed in the adjustment mode, the deviation can be detected even if the image size is smaller than the image size in the adjustment mode.

Next, adjustment of pixels used for imaging by the area sensor 11 will be described.

FIG. 19A is a diagram illustrating the first image size used for imaging in the adjustment mode by the area sensor 11 according to an embodiment of the present disclosure.

Figure 19:
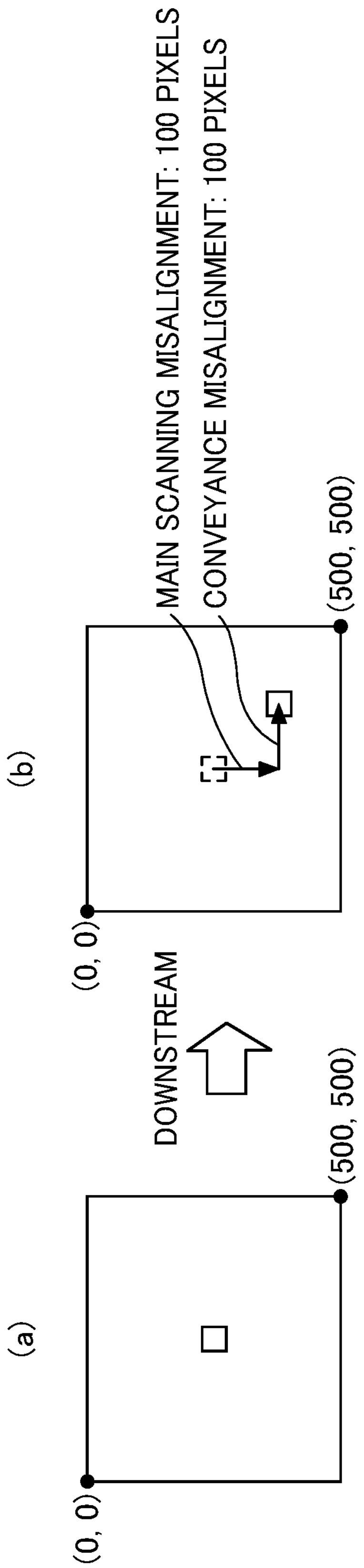
FIG. 19 is a diagram illustrating a first image size used for imaging in the adjustment mode by an area sensor according to an embodiment of the present disclosure.

Part (a) of FIG. 19 illustrates the image data captured in step S1604 of FIG. 16. Part (B) of FIG. 19 illustrates the image data captured in step S1607 of FIG. 16. Because of the adjustment mode, the image data illustrated in part (A) of FIG. 19 and the image data illustrated in part (B) of FIG. 19 are generated in an image size of 500 pixels×500 pixels.

As a result of the cross-correlation calculation between the image data illustrated in part (A) of FIG. 19 and the image data illustrated in part (B) of FIG. 19, the deviation amount in the main-scanning direction is 100 pixels, and the deviation amount in the conveyance direction is 100 pixels.

In this case, the setting unit 406 sets the shifts of 100 pixels in the main scanning direction and 100 pixels in the conveyance direction in the downstream region used for imaging by the area sensor 11.

Figure 20:
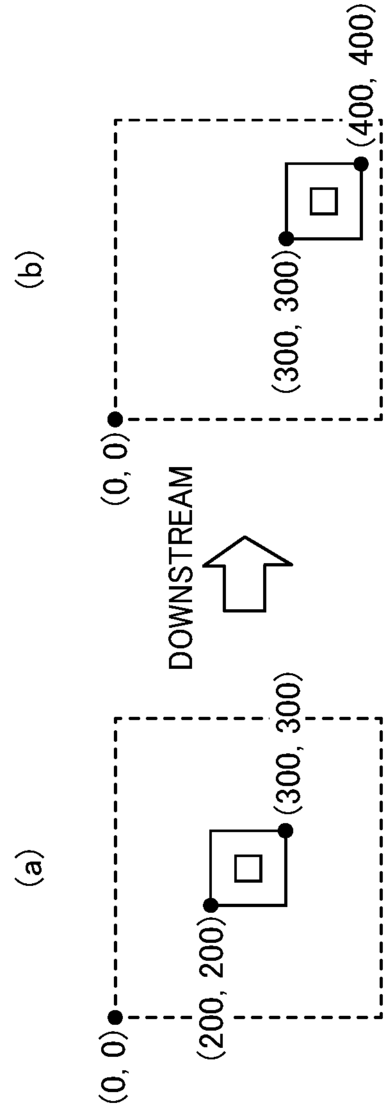
FIG. 20 is a diagram illustrating a second image size used for imaging in the print mode by the area sensor according to an embodiment of the present disclosure.

FIG. 20 is a diagram illustrating the second image size used for imaging in the print mode by the area sensor 11 according to an embodiment of the present disclosure.

A rectangular region having a pixel (200, 200) and a pixel (300, 300) as vertices illustrated in part (A) of FIG. 20 indicates the image data captured in S1705 of FIG. 18. A rectangular region having a pixel (300, 300) and a pixel (400, 400) as vertices illustrated in FIG. 20B indicates the image data captured in S1708 of FIG. 18. Because of the print mode, the image data illustrated in part (A) of FIG. 20 and the image data illustrated in part (B) of FIG. 20 are generated in an image size of 100 pixels×100 pixels.

The region used for capturing the image data illustrated in part (B) of FIG. 20 is set to be shifted by 100 pixels in the main scanning direction and 100 pixels in the conveyance direction as compared with the region used for capturing the image data illustrated in part (A) of FIG. 20. In this manner, the region used for imaging by the area sensor 11 is adjusted according to the deviation amount detected in the adjustment mode. As a result, even if the image size is reduced to 100 pixels×100 pixels, the position of the conveyance target object such as the web 120 can be detected between the upstream side and the downstream side.

The image size is set by the pixel size of the area sensor 11 and the magnification of the lens (for example, the first imaging lens 12A or the second imaging lens 12B). For example, if the pixel size of the area sensor 11 is 8 μm/px and the lens magnification is 1, the image size=the number of pixels×8 (um). In addition, when there is a possibility that a variation of ±1 mm may occur in each of the upstream and the downstream, the variation can be detected if an image of 4 mm×4 mm can be captured. Therefore, in the adjustment mode, the pixel size is 500 pixels, which corresponds to a value obtained by dividing 4 mm by 8 um. As a result, the deviation can be detected regardless of the variation.

In this manner, the range of image capture in the first image size (500 pixels×150 pixels) used for imaging in the adjustment mode is set to be larger than the range indicated by error information. The error information is information set in advance as a specification since there is a possibility that an error may occur in the area sensor 11 that images the regions corresponding to the plurality of liquid discharge head units.

Example of Movement Mechanism

In the present embodiment, a control device CTRLw is further provided as a device that moves the liquid discharge head unit in the main scanning direction based on the deviation amount in the main scanning direction detected by the detection processing unit 403.

The control device CTRLw perform a process of causing the processing position to follow the position change of the web 120 being processed. That is, the control device CTRLw receives the information indicating the deviation amount in the main-scanning direction calculated by the calculator 521.

Then, the control device CTRLw (an example of a movement controller) controls (adjusts) the movement of the liquid discharge head unit in the main scanning direction, based on the deviation amount in the main scanning direction detected in the first image size in the adjustment mode and the deviation amount in the main scanning direction detected in the second image size in the print mode, which is indicated by the received information.

Figure 21:
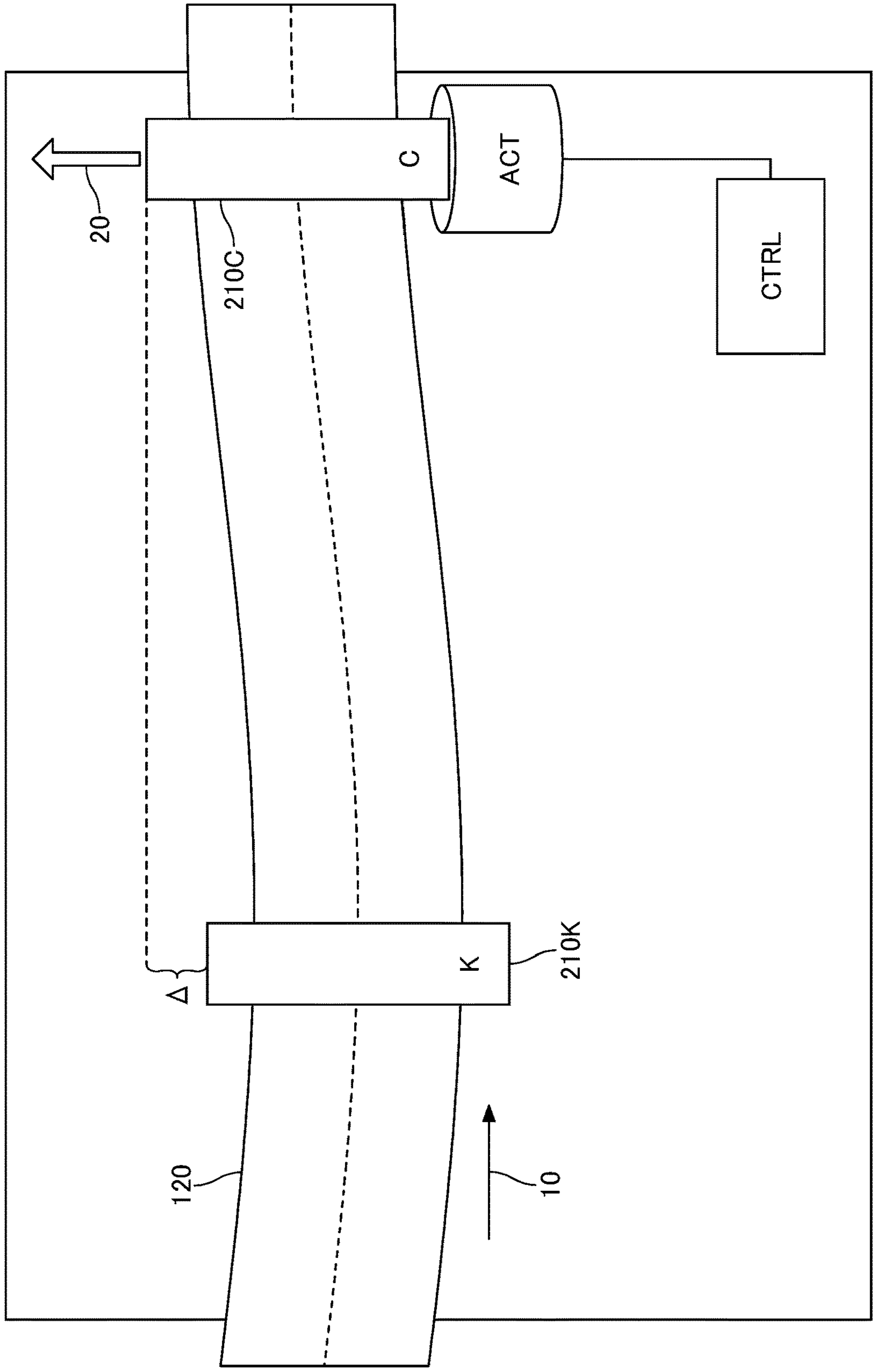
FIG. 21 is a block diagram illustrating a movement mechanism for moving the liquid discharge head unit included in the liquid discharge apparatus according to an embodiment of the present disclosure.

FIG. 21 is a block diagram illustrating a movement mechanism for moving the liquid discharge head unit included in the liquid discharge apparatus 110 according to an embodiment of the present disclosure; and For example, the movement mechanism that implements a movement unit is implemented by hardware or the like as illustrated in the drawing. The illustrated example is an example of a movement mechanism that moves the cyan liquid discharge head unit 210C.

First, in the illustrated example, an actuator ACT such as a linear actuator to move the cyan liquid discharge head unit 210C is installed in the cyan liquid discharge head unit 210C. The actuator ACT is connected to a control device CTRL that controls the actuator ACT.

The actuator ACT is a linear actuator or a motor, for example. The actuator ACT may include a control circuit, a power supply circuit, and a mechanical component.

A movement amount MV is input to the control device CTRL. The movement amount MV is an amount by which the cyan liquid discharge head unit 210C is moved. Furthermore, the deviation amount in the main-scanning direction detected by the detection processing unit 403 is input to the control device CTRL.

The control device CTRL causes the actuator ACT to move the cyan liquid discharge head unit 210C so as to compensate for deviation amount SL in the main scanning direction detected by the detection processing unit 403, based on the movement amount MV.

In the present embodiment, in either the adjustment mode or the print mode, the control device CTRL controls the actuator ACT to move the cyan liquid discharge head unit 210C so as to compensate for deviation amount SL in the main scanning direction detected by the detection processing unit 403. However, the present embodiment is not limited to the compensation for the deviation amount SL in both the adjustment mode and the print mode. The control of compensating for the deviation amount SL may be performed in one of the adjustment mode and the print mode.

In the present embodiment, the position of the head unit is adjusted according to the deviation amount in the main scanning direction detected by the sensor device SEN, so that the accuracy of discharge position of the liquid can be enhanced.

MODIFICATION OF EMBODIMENT

The above-described embodiment is not limited to the structure illustrated in FIG. 1 as an example of the liquid discharge apparatus 110, and may be applied to an inkjet-type image forming apparatus. As a modification, an example in which a liquid discharge apparatus is applied to an inkjet-type image forming apparatus will be described.

Figure 22:
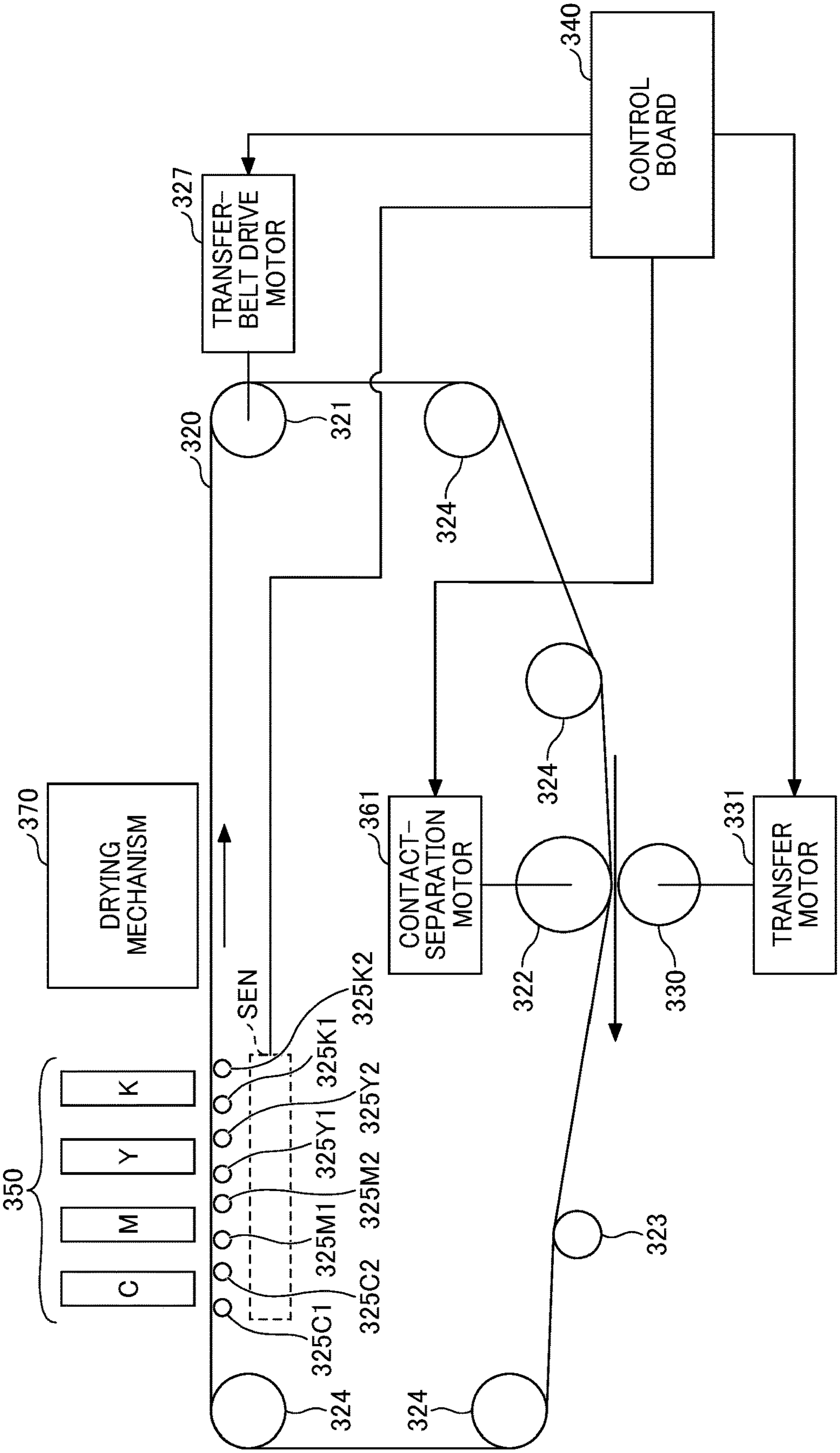
FIG. 22 is a schematic view of an inkjet-type image forming apparatus to which a liquid discharge apparatus according to a modification of the present disclosure is applied.

FIG. 22 is a schematic view of an inkjet-type image forming apparatus to which a liquid discharge apparatus according to a modification of the present disclosure is applied. In the present modification, head units 350C, 350M, 350Y, and 350K discharge ink droplets to form an image on the outer surface of the transfer belt 320. Below, the head units 350C, 350M, 350Y, and 350K are collectively referred to as a "head unit group 350".

A sensor device SEN measures the position of a conveyed object based on the ink liquids discharged from the head units 350C, 350M, 350Y, and 350K of the head unit group 350. As in the above-described embodiment, the sensor device SEN includes a detection device 50, a first light source 51A, a second light source 51B, a control device 52, and a storage device 53. The sensor device SEN detects the position of the conveyance target object based on the ink liquids discharged from the head units 350C, 350M, 350Y, and 350K and performs adjustments based on a deviation as in the above-described embodiment. Specific processing is similar to the processing in the above-described embodiment, and the description of the specific processing will be omitted.

Next, a drying mechanism 370 dries an image on the transfer belt 320 to form a filmed image.

Subsequently, in the transfer section where the transfer belt 320 faces a transfer roller 330, the liquid discharge apparatus 110 transfers the filmed image on the transfer belt 320 onto a sheet of paper.

A cleaning roller 323 cleans the surface of the transfer belt 320 after the transfer.

As described above, in the present modification, in the inkjet-type image forming apparatus to which the liquid discharge apparatus is applied, for example, the head units 350C, 350M, 350Y, and 350K, the drying mechanism 370, the cleaning roller 323, and the transfer roller 330 are disposed around the transfer belt 320.

In the present modification, the transfer belt 320 is stretched around a drive roller 321, a counter roller 322, four shape maintaining rollers 324, and eight support rollers 325C1, 325C2, 325M1, 325M2, 325Y1, 325Y2, 325K1, and 325K2, and rotates in the direction of arrow in the drawing following the drive roller 321 rotated by a transfer-belt drive motor 327. The direction in which the transfer belt 320 moves by the rotation of the drive roller 321 is defined as a conveyance direction in which a conveyance target object is conveyed.

The eight support rollers 325C1, 325C2, 325M1, 325M2, 325Y1, 325Y2, 325K1, and 325K2 are provided so as to face the head unit group 350 and maintain the tensile state of the transfer belt 320 when the ink droplets are discharged from the head unit group 350. A transfer motor 331 rotationally drives the transfer roller 330.

In the modification, the counter roller 322 moves the transfer belt 320 to perform a contact-separation operation with respect to the transfer roller 330.

The counter roller 322 is moved by a contact-separation motor 361. A control board 340 is a board that outputs drive signals to the transfer-belt drive motor 327, the contact-separation motor 361, and the transfer motor 331.

The control board 340 may further include the functions of the controller 520 and the calculator 521 described above, control the sensor device SEN, and adjust, for example, the discharge timing of the head unit group 350 on the basis of the results of detection by the sensor device SEN.

In the example of FIG. 22, the counter roller performs the contact-separation operation, but the transfer roller may perform the contact-separation operation with respect to the transfer belt.

This modification is not limited to the hardware configuration such as the controller 520 and the calculator 521 of the above-described embodiment. For example, the controller 520 and the calculator 521 may be implemented with one configuration. In this modification, an arithmetic processor 500 that implements the configurations of the controller 520 and the calculator 521 is disposed on the control board 340.

Figure 23:
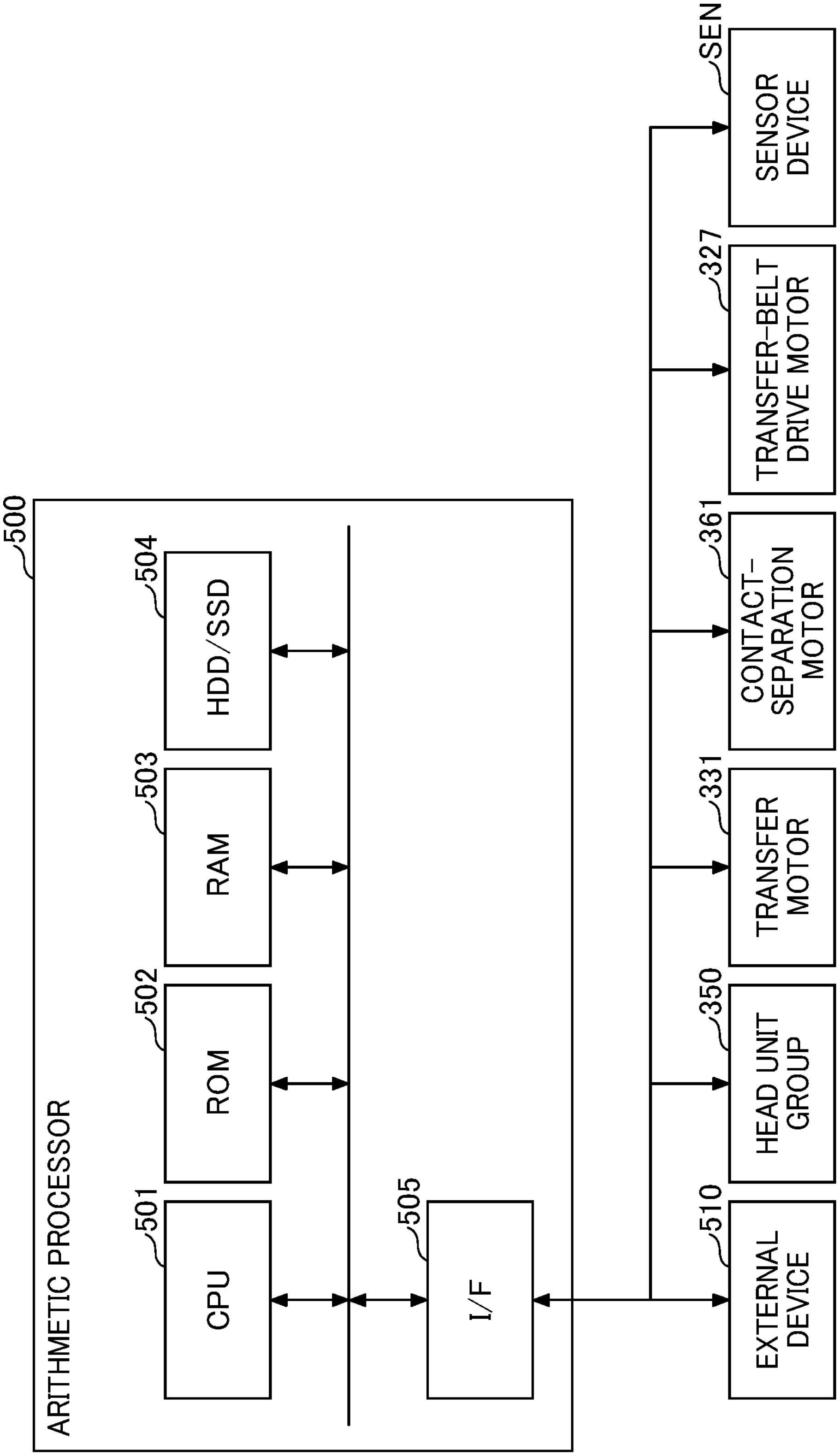
FIG. 23 is a block diagram illustrating the hardware configuration of an arithmetic processor mounted on a control board of an image forming apparatus according to a modification of the present disclosure.

The arithmetic processor 500 for implementing the configurations of the controller 520 and calculator 521 will be described. FIG. 23 is a block diagram illustrating the hardware configuration of the arithmetic processor 500.

As illustrated in FIG. 23, the arithmetic processor 500 includes a CPU 501, a ROM 502, a RAM 503, a hard disk drive/solid state drive (HDD/SSD) 504 and an I/F 505.

The CPU 501 uses the RAM 503 as a working area and executes programs stored in the ROM 502. Thus, the CPU 501 implements a software configuration for configuring the controller 520 and calculator 521 described above.

The HDD/SSD 504 is used as a storage device and stores preset setting values. The data stored in the HDD/SSD 504 may be used by the CPU 501 when the CPU 501 read the data in executing programs.

The I/F 505 is an interface that communicably connects an external device 510, the head unit group 350, the transfer-belt drive motor 327, the contact-separation motor 361, the transfer motor 331, and the sensor device SEN to the arithmetic processor 500. The external device 510 is, for example, a client personal computer. In other words, in the present embodiment, liquid discharge control may be performed based on image data from the external device 510.

In the above-described embodiment and the modification, a positional deviation is detected by the image sensor (e.g., the area sensor 11) included in the sensor device SEN, thus enhancing the accuracy of detection of the deviation between the head units. In the above-described embodiment and modification, the area sensor 11 is arranged so that each head unit can capture an image in order to enhance the accuracy of landing position between the head units. As a result, since the actual position of a sheet between the head units at the discharge timing is detected, the discharge timing can be easily adjusted.

First Modification

In the above-described embodiment, an example has been described in which the liquid discharge head unit group 210 includes the sensor devices SENY, SENM, SENC, and SENK in the liquid discharge apparatus 110. In the embodiment described above, the calculator 521 calculates the amount of deviation between the liquid discharge head unit 210Y, 210M, 210C, and 210K of the liquid discharge head unit group 210 based on the detection results input from the sensor devices SENY, SENM, SENC, and SENK. At that time, the adjustment mode and the print mode are switched to balance the detection accuracy of the amount of deviation and the printing speed.

However, the above-described embodiment is not limited to the example in which the liquid discharge head unit group 210 includes four sensor devices SENY, SENM, SENC, and SENK.

Then, in the first modification described below, an example is described in which two sensor devices SENM and SENK are disposed.

Figure 24:
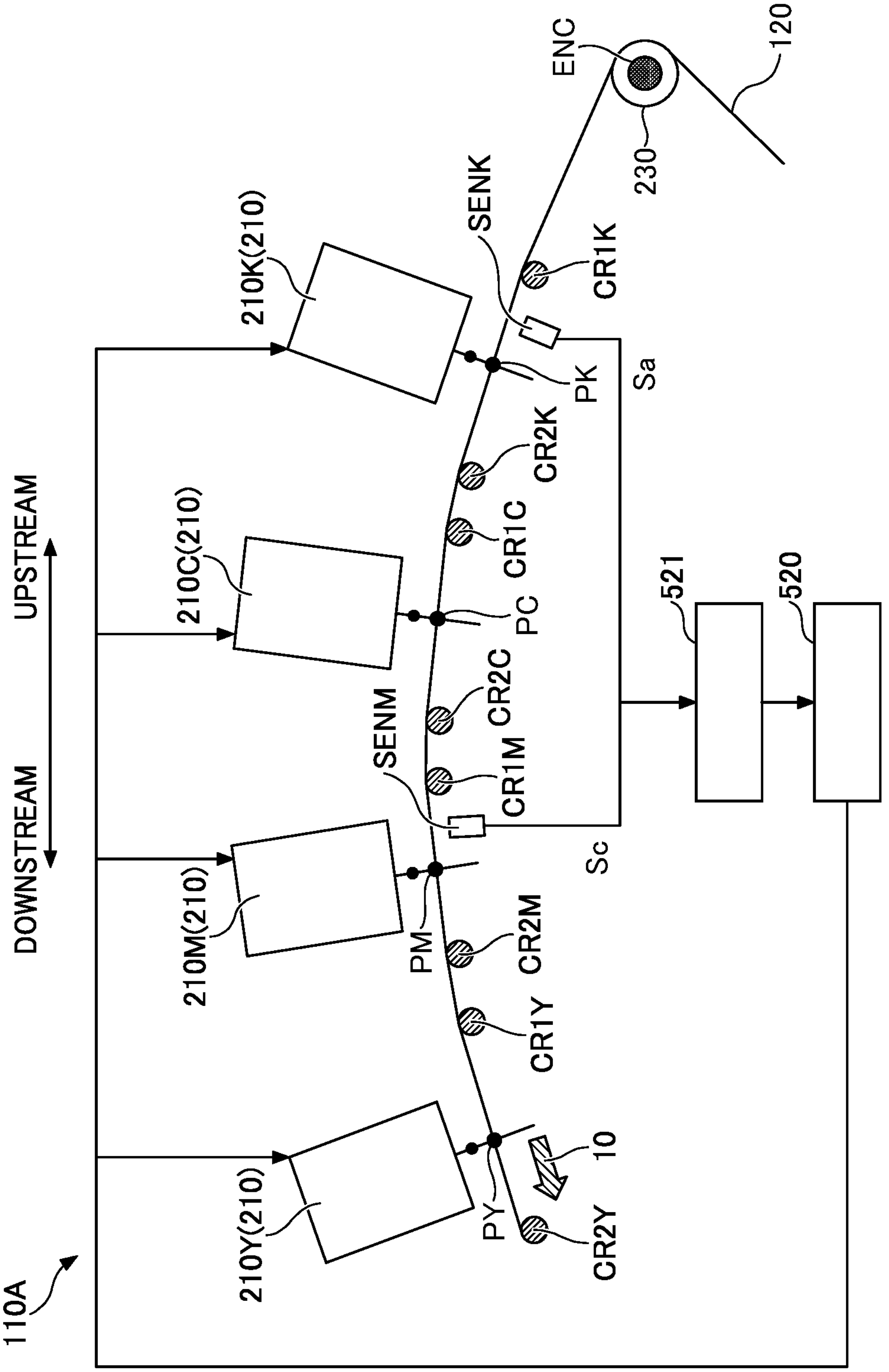
FIG. 24 is a diagram illustrating the configuration of a liquid discharge apparatus according to a first modification of the present disclosure.

FIG. 24 is a diagram illustrating the configuration of a liquid discharge apparatus 110A according to the first modification. In the first modification, ink is discharged from each of the four liquid discharge head units 210K, 210C, 210M, and 210Y, and ink is applied to the web 120 to form an image, as in the above-described embodiment.

In this modification, four liquid discharge head units 210K, 210C, 210M, and 210Y are disposed, while two sensor devices SENM and SENK are disposed. In this modification, the number of sensor devices SENM and SENK is smaller than the number of liquid discharge head units 210K, 210C, 210M, and 210Y.

The sensor devices SENM and SENK are provided corresponding to the positions of the black liquid discharge head unit 210K and the magenta liquid discharge head unit 210M. Specifically, the sensor device SENK is disposed at a position corresponding to the black liquid discharge head unit 210K disposed most upstream in the conveyance direction 10 among the four liquid discharge head units 210K, 210C, 210M, and 210Y. On the other hand, the sensor device SENM is disposed at a position corresponding to the third magenta liquid discharge head unit 210M from the upstream side. The specific positions where the sensor device SENK and the sensor device SENM are disposed are the same as in the above-described embodiment, and the description thereof is omitted.

The calculator 521 can acquire the image data Sa captured by the sensor device SENK and the image data Sc captured by the sensor device SENM.

When the controller 520 starts conveying the web 120, the calculator 521 acquires image data Sa captured by the sensor device SENK. The calculator 521 starts counting by an encoder pulse ENP output from the encoder ENC.

When the calculator 521 determines from the count value of the encoder pulse ENP that the sensor device SENM on the downstream side has reached the position where an image can be captured, the arithmetic device 54 outputs the camera trigger to the sensor device SENM, the calculator 521 acquires the image data captured by the sensor device SENM. The calculator 521 stores in advance the distance between the sensor device SENK and the sensor device SENM.

Therefore, the calculator 521 can calculate the deviation amount (conveyance amount error) of the web 120 in the conveyance direction from the correlation image data generated based on the image data Sa captured on the upstream side and the image data Sc captured on the downstream side.

In this modification, the controller 520 controls the discharge timing for each of the four liquid discharge head units 210K, 210C, 210M, and 210Y to reduce the conveyance amount error occurring in the web 120 based on the deviation amount (conveyance amount error) of the web 120 in the conveyance direction. The method of adjusting the discharge timing for each of the four liquid discharge head units 210K, 210C, 210M, and 210Y, which corresponds to the conveyance amount error occurring in the web 120 may be any suitable method including a conventionally used method. This modification does not limit the processing based on the deviation amount only in the conveyance direction, and the calculation of the deviation amount in the main scanning direction and the adjustment of reducing the deviation amount in the main scanning direction may also be performed. The adjustment method in the main scanning direction is the same as in the above embodiment.

In this modification, switching between the adjustment mode and the print mode is used in the same manner as in the above-described embodiment in order to calculate the deviation amount (conveyance amount error) of the web 120 in the conveyance direction.

In the adjustment mode, the web 120 is conveyed at a first conveyance speed (e.g., 200 mm/s). The calculator 521 calculates deviation amounts (conveyance amount errors) of the web 120 in the conveyance direction and the main scanning direction based on the image data Sa captured with the first image size by the sensor device SENK and the image data Sc captured with the first image size by the sensor device SENM. The calculator 521 adjusts the positions of the pixels of the area sensor 11 used for imaging in at least one of the sensor device SENK or the sensor device SENM based on the calculated deviation amount. The adjustment method is the same as in the above-described embodiment, and the description thereof is omitted.

Then, the adjustment mode is switched to the print mode. Thus, the web 120 is conveyed at the second conveyance speed (e.g., 30000 mm/s). The calculator 521 calculates the deviation amount (conveyance amount error) of the web 120 in the conveyance direction based on the image data Sa captured with the second image size by the sensor device SENK and the image data Sc captured with the second image size by the sensor device SENM. The controller 520 controls the discharge timing for each of the four liquid discharge head units 210K, 210C, 210M, and 210Y to reduce the conveyance amount error occurring in the web 120 based on the deviation amount (conveyance amount error) of the web 120 in the conveyance direction. The first image size and the second image size are the same as in the above-described embodiment.

In the print mode of this modification, the print speed of 3000 mm/s is increased as compared with the adjustment mode. However, the second image size is as small as 100 pixels×100 pixels, thus allowing the deviation to be detected without a delay due to the processing load. In addition, since the initial adjustment is performed in the adjustment mode, the deviation can be detected even if the image size is smaller than the image size in the adjustment mode.

Second to Sixth Modifications

In the first modification described above, the liquid discharge apparatus 110A includes the sensor device SENK disposed in the vicinity directly below the black liquid discharge head unit 210K and the sensor device SENM disposed in the vicinity directly below the magenta liquid discharge head unit 210M. However, the configuration of a liquid discharge apparatus is not limited to this configuration and various modifications are possible.

Figure 25:
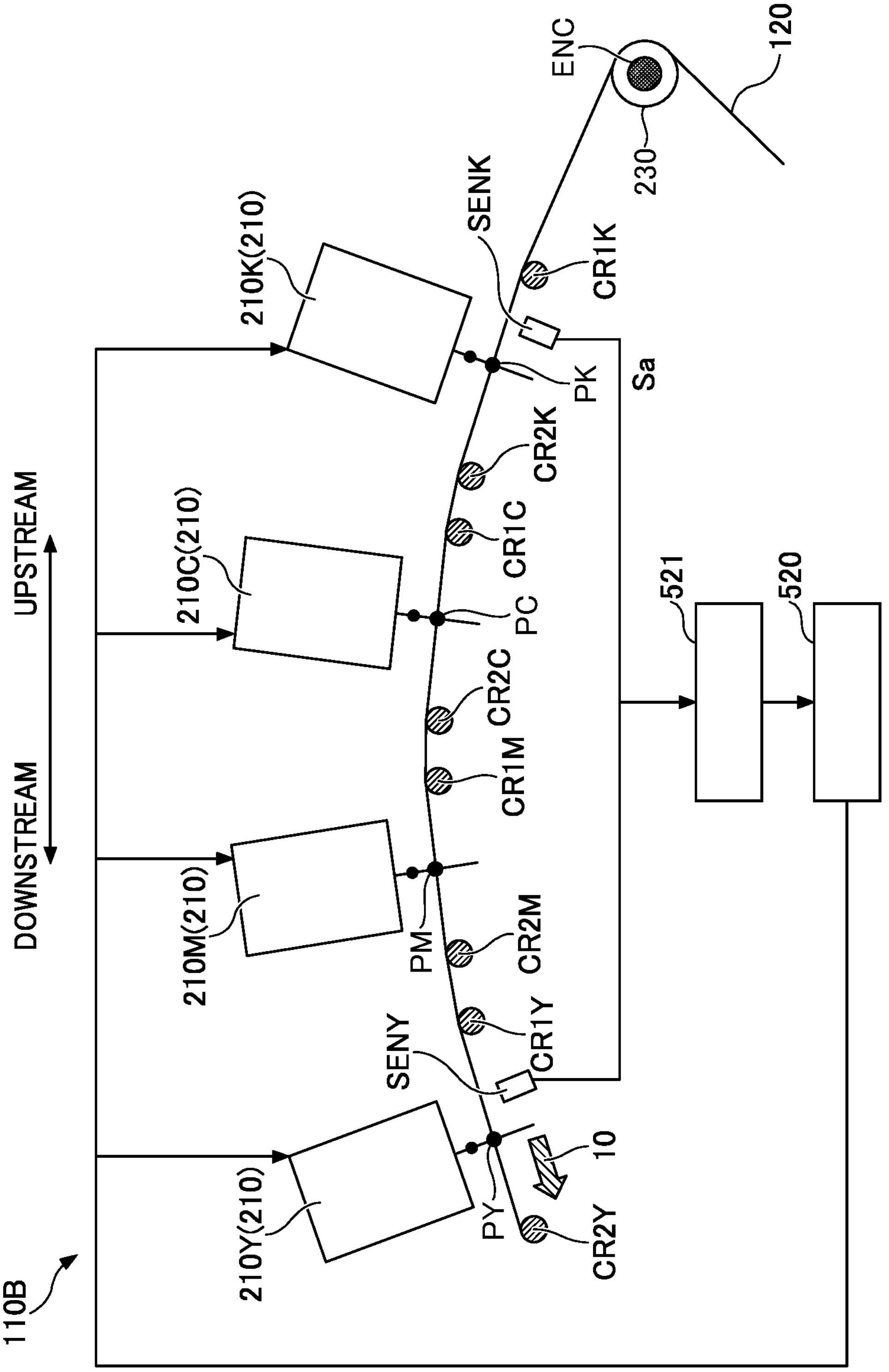
FIG. 25 is a diagram illustrating the configuration of a liquid discharge apparatus according to a second modification of the present disclosure.
Figure 26:
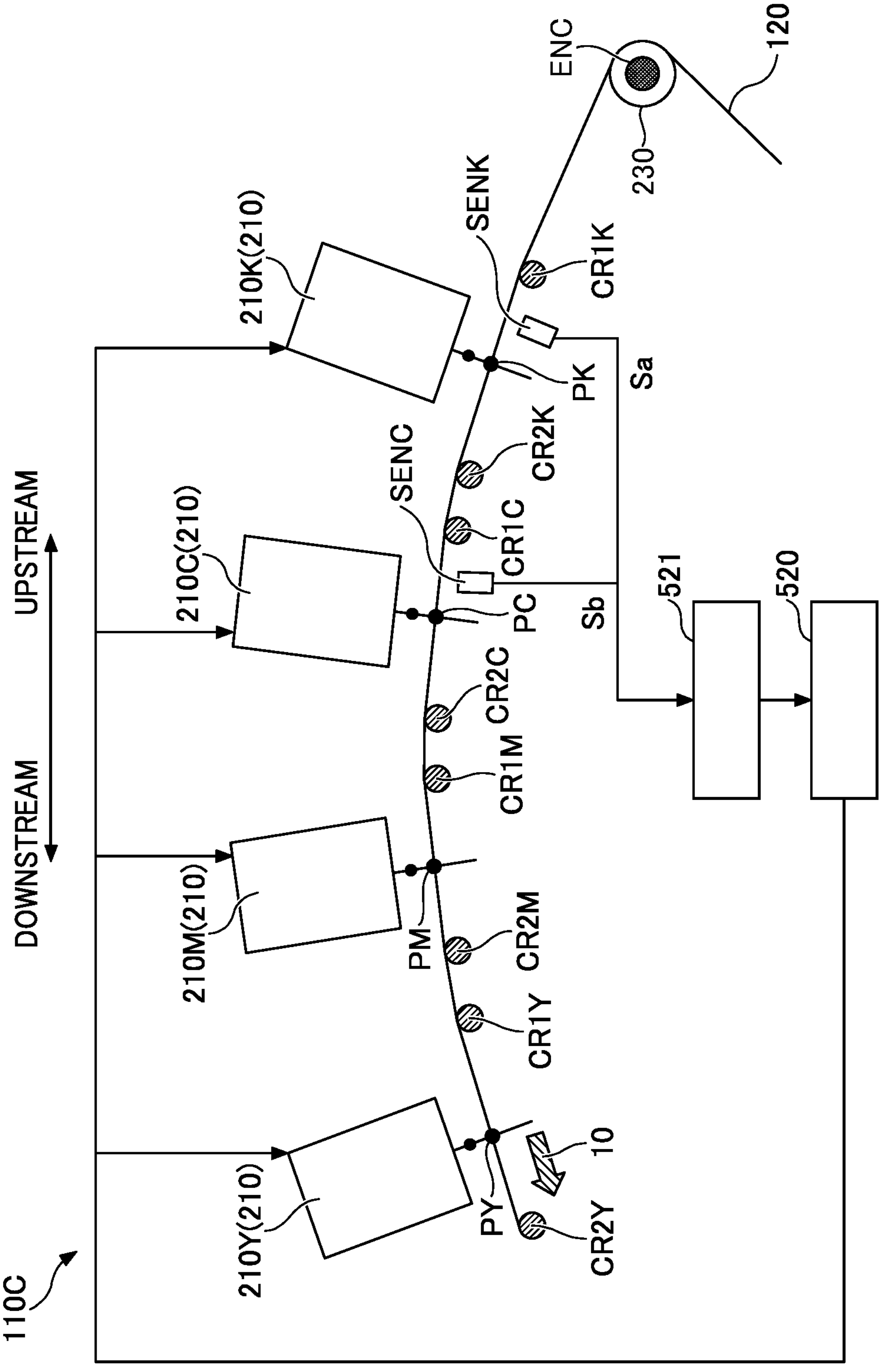
FIG. 26 is a diagram illustrating the configuration of a liquid discharge apparatus according to a third modification of the present disclosure.
Figure 27:
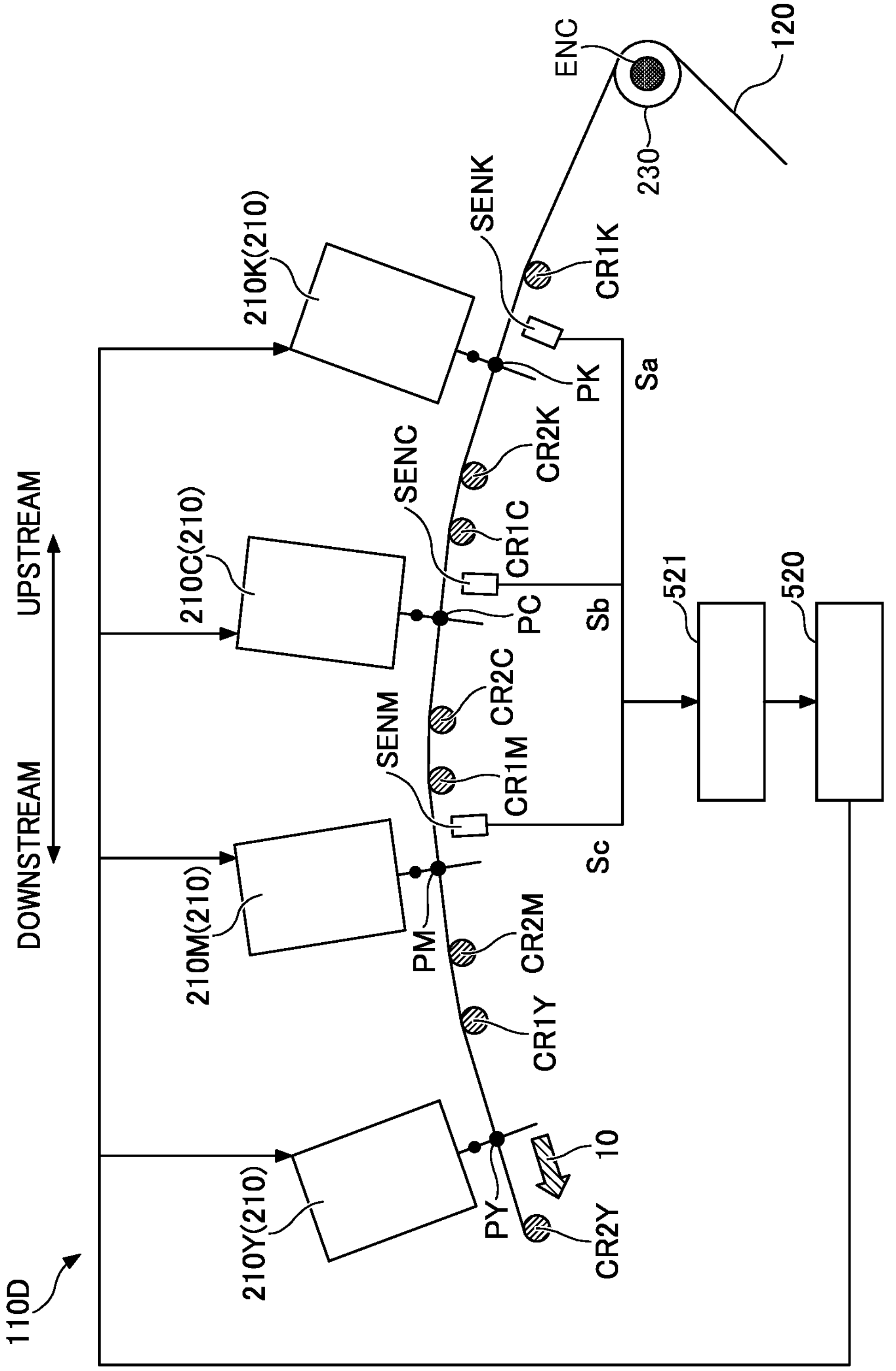
FIG. 27 is a diagram illustrating the configuration of a liquid discharge apparatus according to a fourth modification of the present disclosure.
Figure 28:
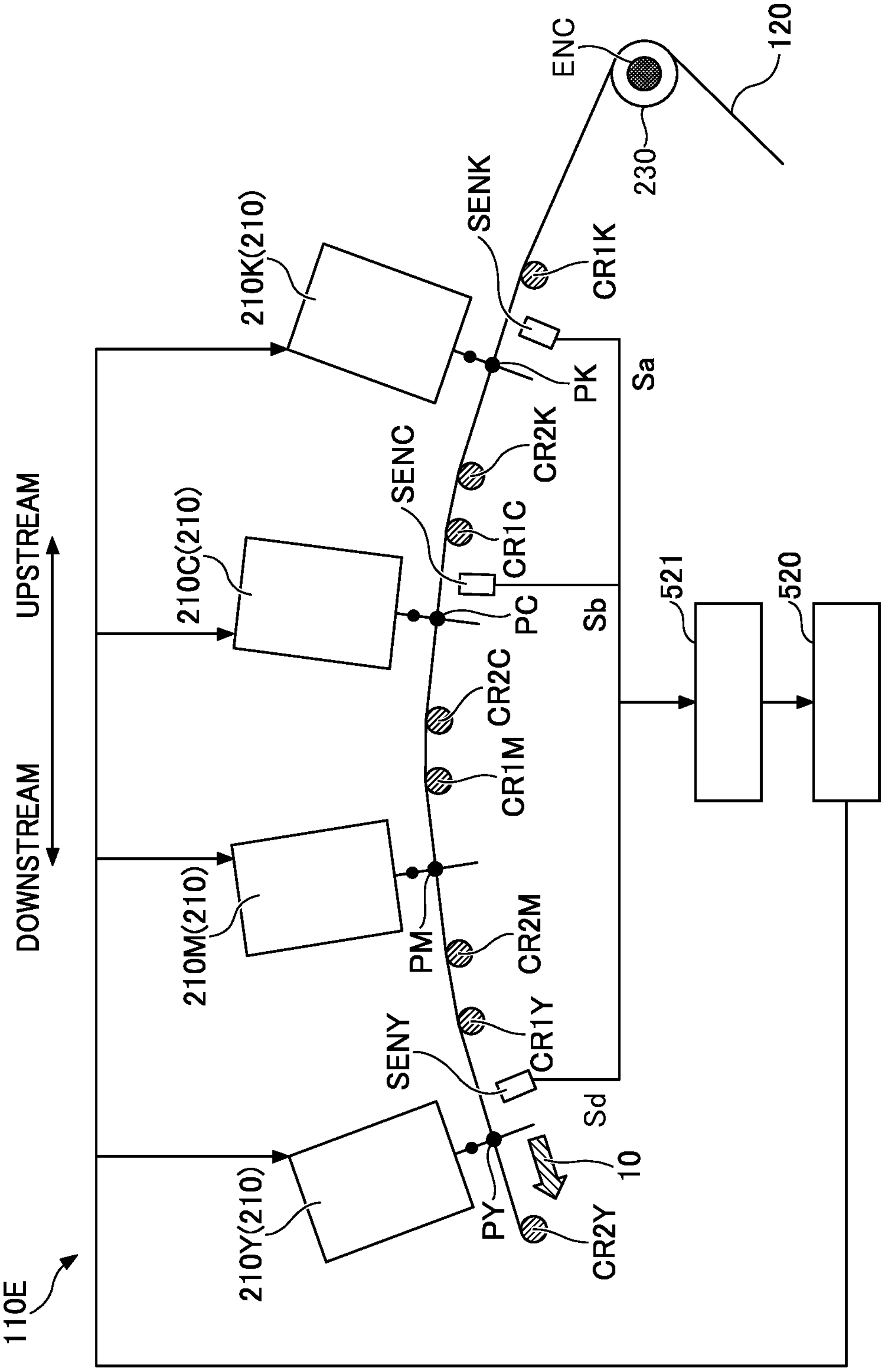
FIG. 28 is a diagram illustrating the configuration of a liquid discharge apparatus according to a fifth modification of the present disclosure.
Figure 29:
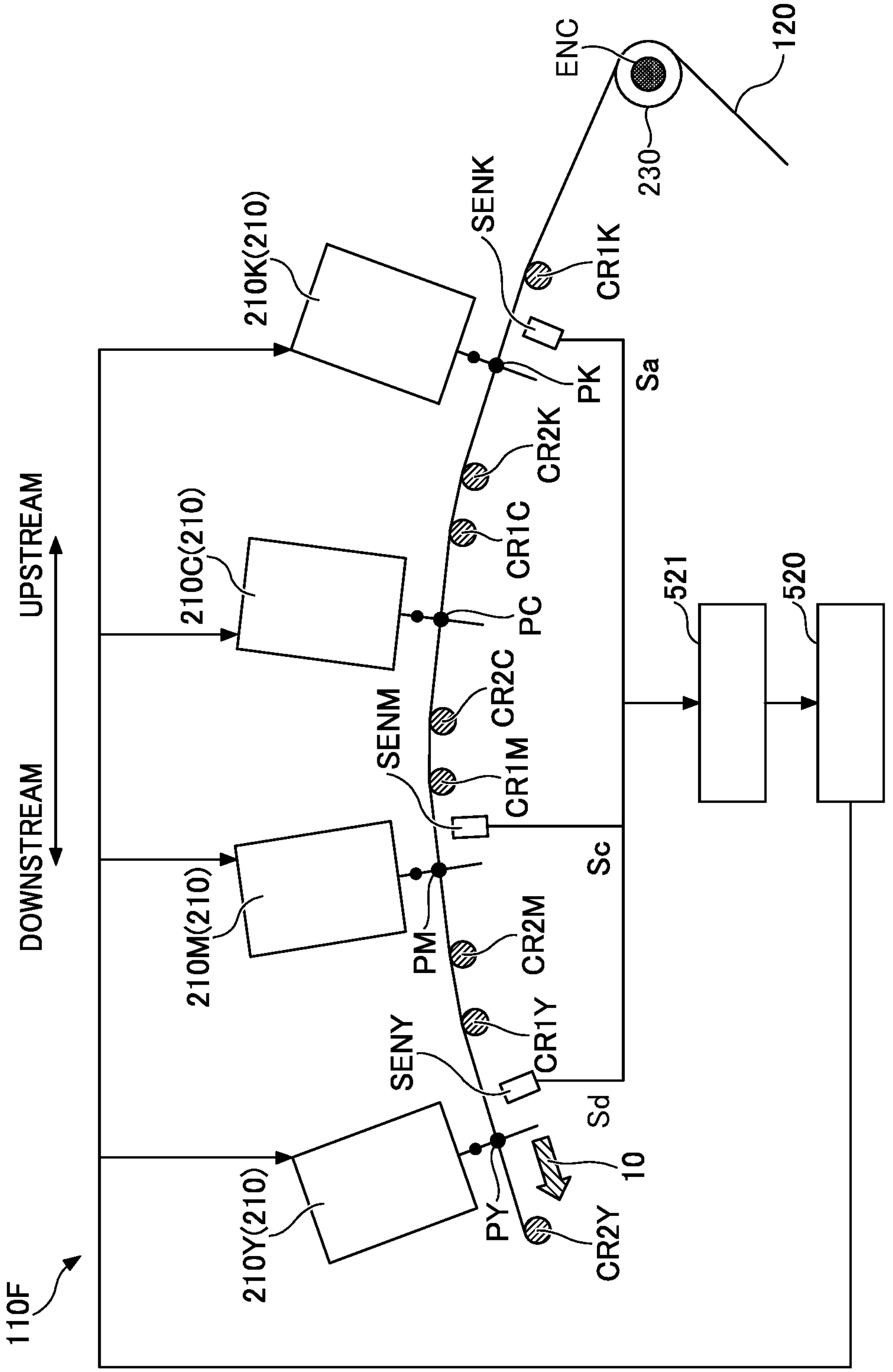
FIG. 29 is a diagram illustrating the configuration of a liquid discharge apparatus according to a sixth modification of the present disclosure.

FIGS. 25, 26, 27, 28, and 29 are diagrams illustrating configurations of liquid discharge apparatuses according to various modifications. FIG. 25 illustrates a second modification, FIG. 26 illustrates a third modification, FIG. 27 illustrates a fourth modification, FIG. 28 illustrates a fifth modification, and FIG. 29 illustrates a sixth modification.

As illustrated in FIG. 25, a liquid discharge apparatus 110B according to the second modification includes a sensor device SENK disposed in the vicinity directly below a black liquid discharge head unit 210K and a sensor device SENY disposed in the vicinity directly below a yellow liquid discharge head unit 210Y. The sensor device SENY outputs image data Sd obtained by imaging the web 120 at a position corresponding to the yellow liquid discharge head unit 210Y.

As illustrated in FIG. 26, a liquid discharge apparatus 110C according to the third modification includes a sensor device SENK disposed in the vicinity directly below a black liquid discharge head unit 210K and a sensor device SENC disposed in the vicinity directly below a cyan liquid discharge head unit 210C. The sensor device SENC outputs image data Sb obtained by imaging the web 120 at a position corresponding to the cyan liquid discharge head unit 210C.

As illustrated in FIG. 27, a liquid discharge apparatus 110D according to the fourth modification includes a sensor device SENK disposed in the vicinity directly below a black liquid discharge head unit 210K, a sensor device SENC disposed in the vicinity directly below a cyan liquid discharge head unit 210C, and a sensor device SENM disposed in the vicinity directly below a magenta liquid discharge head unit 210M. The sensor device SENC outputs image data Sb obtained by imaging the web 120 at a position corresponding to the cyan liquid discharge head unit 210C. The sensor device SENM outputs image data Sc obtained by imaging the web 120 at a position corresponding to the magenta liquid discharge head unit 210M.

As illustrated in FIG. 28, a liquid discharge apparatus 110E according to the fifth modification includes a sensor device SENK disposed in the vicinity directly below a black liquid discharge head unit 210K, a sensor device SENC disposed in the vicinity directly below a cyan liquid discharge head unit 210C, and a sensor device SENY disposed in the vicinity directly below a yellow liquid discharge head unit 210Y. The sensor device SENC outputs image data Sb obtained by imaging the web 120 at a position corresponding to the cyan liquid discharge head unit 210C. The sensor device SENY outputs image data Sd obtained by imaging the web 120 at a position corresponding to the yellow liquid discharge head unit 210Y.

As illustrated in FIG. 29, a liquid discharge apparatus 110F according to the sixth modification includes a sensor device SENK disposed in the vicinity directly below a black liquid discharge head unit 210K, a sensor device SENM disposed in the vicinity directly below a magenta liquid discharge head unit 210M, and a sensor device SENY disposed in the vicinity directly below a yellow liquid discharge head unit 210Y. The sensor device SENC outputs image data Sc obtained by imaging the web 120 at a position corresponding to the magenta liquid discharge head unit 210M. The sensor device SENY outputs image data Sd obtained by imaging the web 120 at a position corresponding to the yellow liquid discharge head unit 210Y.

The liquid discharge apparatuses 110B, 110C, 110D, 110E, and 110F described above perform the same control as the liquid discharge apparatus 110A according to the first modification. Accordingly, the liquid discharge apparatuses 110B, 110C, 110D, 110E, and 110F can obtain substantially the same effects as the liquid discharge apparatus 110A.

Typically, an image sensor used to detect the position of a paper sheet takes a longer time for processing per sheet of image data as the number of pixels used for imaging increases. For this reason, it is preferable to decrease the number of pixels used for imaging, in other words, to reduce the image size of the imaged data as the print speed of the paper sheet becomes higher.

However, when the image size of the imaged data is reduced, the imaging range is narrowed, which may hamper detection the deviation between the head units.

In the above-described embodiment and modifications, the positions of the pixels to be used for imaging are adjusted according to the deviation between the head units in the adjustment mode in which the print speed is low but the image data to be captured is large. Therefore, the sensor device SEN can detect the position of the conveyance target object with high accuracy even in the print mode in which the print speed is high but the image data to be captured is small. Since the deviation amount is detected also in the print mode, fine adjustment based on the deviation generated during printing can be achieved.

An embodiment of the present disclosure may be, for example, a conveyance device in which a head unit emits a laser and performs patterning processing on a substrate that is a conveyance target object by the laser. Specifically, the conveyance device includes laser heads arranged in a line in a direction orthogonal to the conveyance direction in which the substrate is conveyed. The transfer device detects the position of the substrate, and moves the head unit based on the detection result. In the present embodiment, the processing position is a position where the substrate is irradiated with the laser.

The embodiment according to the present disclosure may be implemented by a program for causing a computer in a conveyance device, an information processing device, or a combination of these devices to execute partially or entirely a timing adjustment method for discharging a liquid.

Although several embodiments of the present disclosure have been described above in detail, embodiments of the present disclosure are not limited to the specific embodiments, and various modifications or variations can be made within the scope of the gist of the present disclosure.

Aspects of the present disclosure are, for example, as follows.

Aspect 1

A liquid discharge apparatus includes: a plurality of liquid discharge head units disposed at different positions on a path in a conveyance direction in which an object is to be conveyed; an image sensor to image a region of the object onto which liquid has been discharged by the plurality of liquid discharge head units; a detection processing unit to detect, based on image data imaged by the image sensor, an amount of deviation between positions on the object onto which the liquid has been discharged by the plurality of liquid discharge head units; a correction unit to correct a timing of discharging the liquid from the plurality of liquid discharge head units, based on the amount of deviation detected by the detection processing unit; a switching control unit to, as control performed while the detection processing unit detects the amount of deviation, switch between a first control of conveying the object at a first conveyance speed while the image sensor images the object with a first image size and a second control of conveying the object at a second conveyance speed faster than the first conveyance speed while the image sensor images the object with a second image size having a smaller number of pixels than the first image size; and a setting unit to set pixel positions of the image sensor used for imaging while the second control is performed, according to the amount of deviation detected by the detection processing unit based on the image data imaged with the first image size by the first control.

Aspect 2

The liquid discharge apparatus according to aspect 1, wherein the setting unit sets a position of a pixel in the image sensor corresponding to a region on a downstream side in the conveyance direction among regions on which the liquid has been discharged by each of the plurality of liquid discharge head units.

Aspect 3

A liquid discharge apparatus includes: a plurality of liquid discharge head units disposed at different positions on a path in a conveyance direction in which an object is to be conveyed; an image sensor provided for each of the plurality of liquid discharge head units to image a region of the object onto which liquid has been discharged by the plurality of liquid discharge head units; a detection processing unit to detect, based on image data imaged by the image sensor, an amount of deviation between positions on the object onto which the liquid has been discharged by the plurality of liquid discharge head units; a correction unit to correct a timing of discharging the liquid from the plurality of liquid discharge head units, based on the amount of deviation detected by the detection processing unit; a switching control unit to, as control performed while the detection processing unit detects the amount of deviation, switch between a first control of conveying the object at a first conveyance speed while the image sensor images the object with a first image size and a second control of conveying the object at a second conveyance speed faster than the first conveyance speed while the image sensor images the object with a second image size having a smaller number of pixels than the first image size; and a movement control unit to control movement of the plurality of liquid discharge head units in a main scanning direction based on at least one of an amount of deviation in the main scanning direction detected with the first image size while the first control is performed or an amount of deviation in the main scanning direction detected with the second image size while the second control is performed.

Aspect 4

The liquid discharge apparatus according to any one of aspects 1 to 3, wherein, in the first control, the number of frames to be imaged per predetermined time is set to be smaller than the number of frames per predetermined time with which the image data can be acquired from the image sensor when the image sensor images the object with the first image size, and in the second control, the number of frames to be captured per predetermined time is set to be smaller than the number of frames per predetermined time with which the image data can be acquired from the image sensor when the image sensor images the object with the second image size.

Aspect 5

The liquid discharge apparatus according to any one of aspects 1 to 4, wherein in the second control switched by the switching control unit, in a case where the liquid discharge apparatus conveys the object at the second conveyance speed set based on a maximum speed at which the liquid discharge apparatus is capable of conveying the object, the second image size is set such that the image data can be acquired from the image sensor during a period from imaging of a predetermined region on an upstream side in the conveyance direction to imaging of the predetermined region on a downstream side in the conveyance direction.

Aspect 6

The liquid discharge apparatus according to any one of aspects 1 to 5, wherein a range imaged with the first image size used for imaging in the first control switched by the switching control unit is larger than a range indicated by preset information of an error that possibly occurs between image sensors that image respective regions corresponding to the plurality of liquid discharge head units.

Aspect 7

A detection method to be performed by a liquid discharge apparatus that includes a plurality of liquid discharge head units disposed at different positions on a path in a conveyance direction to which an object is to be conveyed and an image sensor to image a region of the object onto which liquid has been discharged by the plurality of liquid discharge head units, the method including: detecting, based on image data imaged by the image sensor, an amount of deviation between positions on the object onto which the liquid has been discharged by the plurality of liquid discharge head units; correcting a timing of discharging the liquid from the plurality of liquid discharge head units, based on the amount of deviation detected by the detecting; as control performed while the detection processing unit detects the amount of deviation, switching between a first control of conveying the object at a first conveyance speed while the image sensor images the object with a first image size and a second control of conveying the object at a second conveyance speed faster than the first conveyance speed while the image sensor images the object with a second image size having a smaller number of pixels than the first image size; and setting pixel positions of the image sensor used for imaging while the second control is performed, according to the amount of deviation detected by the detection processing unit based on the image data imaged with the first image size by the first control.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus, comprising:

a plurality of liquid discharge head units disposed at different positions on a path in a conveyance direction in which an object is to be conveyed;

an image sensor configured to image a region of the object onto which liquid has been discharged by the plurality of liquid discharge head units;

processing circuitry configured to:

detect, based on image data imaged by the image sensor, an amount of deviation between positions on the object onto which the liquid has been discharged by the plurality of liquid discharge head units;

correct a timing of discharging the liquid from the plurality of liquid discharge head units, based on the amount of deviation detected;

perform a sequence of controls and operations while detecting the amount of deviation, the controls and operations comprising, in sequence:

a first control of conveying the object at a first conveyance speed while the image sensor images the object with a first image size;

start a printing operation; and a second control of conveying the object at a second conveyance speed faster than the first conveyance speed while the image sensor images the object with a second image size having a smaller number of pixels than the first image size; and set pixel positions of the image sensor used for imaging while the second control is performed, according to the amount of deviation detected based on the image data imaged with the first image size by the first control.

2. The liquid discharge apparatus according to claim 1, wherein the processing circuitry is configured to set a position of a pixel in the image sensor corresponding to a region on a downstream side in the conveyance direction among regions on which the liquid has been discharged by each of the plurality of liquid discharge head units.

3. The liquid discharge apparatus according to claim 1, wherein, in the first control, a sampling speed frame rate of the image sensor is set to be smaller than a image sensor processing speed frame rate of the image sensor when the image sensor images the object with the first image size, and in the second control, the sampling speed frame rate of the image sensor is set to be smaller than the image sensor processing speed frame rate of the image sensor when the image sensor images the object with the second image size.

4. The liquid discharge apparatus according to claim 1, wherein in the second control switched by the processing circuitry, in a case where the liquid discharge apparatus conveys the object at the second conveyance speed set based on a maximum speed at which the liquid discharge apparatus is capable of conveying the object, the second image size is set such that the image data is acquired from the image sensor during a period from imaging of a predetermined region on an upstream side in the conveyance direction to imaging of the predetermined region on a downstream side in the conveyance direction.

5. The liquid discharge apparatus according to claim 1, wherein a range imaged with the first image size used for imaging in the first control switched by the processing circuitry is larger than a range indicated by preset information of an error that possibly occurs between image sensors that image respective regions corresponding to the plurality of liquid discharge head units.

6. A detection method to be performed by a liquid discharge apparatus that includes a plurality of liquid discharge head units disposed at different positions on a path in a conveyance direction to which an object is to be conveyed and an image sensor to image a region of the object onto which liquid has been discharged by the plurality of liquid discharge head units, the method comprising:

detecting, based on image data imaged by the image sensor, an amount of deviation between positions on the object onto which the liquid has been discharged by the plurality of liquid discharge head units;

correcting a timing of discharging the liquid from the plurality of liquid discharge head units, based on the amount of deviation detected by the detecting;

perform a sequence of controls and operations while detecting the amount of deviation, the controls and operations comprising, in sequence:

a first control of conveying the object at a first conveyance speed while the image sensor images the object with a first image size;

start a printing operation; and a second control of conveying the object at a second conveyance speed faster than the first conveyance speed while the image sensor images the object with a second image size having a smaller number of pixels than the first image size; and setting pixel positions of the image sensor used for imaging while the second control is performed, according to the amount of deviation based on the image data imaged with the first image size by the first control.

* * * * *